US012651983B2

(12) United States Patent
Shibata

(10) Patent No.: US 12,651,983 B2
(45) Date of Patent: Jun. 9, 2026

(54) MOTOR CONTROL DEVICE FOR CONTROLLING ENERGIZATION TO MOTOR HAVING TWO THREE-PHASE WINDING SETS

(71) Applicant: DENSO CORPORATION, Kariya-city (JP)

(72) Inventor: Yusuke Shibata, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 201 days.

(21) Appl. No.: 18/625,024

(22) Filed: Apr. 2, 2024

(65) Prior Publication Data

US 2024/0250624 A1 Jul. 25, 2024

Related U.S. Application Data

(63) Continuation of application No. PCT/JP2022/037088, filed on Oct. 4, 2022.

(30) Foreign Application Priority Data

Oct. 5, 2021 (JP) ................................. 2021-164064

(51) Int. Cl.
| | |
|---|---|
| *H02P 6/12* | (2006.01) |
| *H02P 3/18* | (2006.01) |
| *H02P 23/14* | (2006.01) |
| *H02P 25/03* | (2016.01) |

(52) U.S. Cl.
CPC ................ *H02P 3/18* (2013.01); *H02P 23/14* (2013.01); *H02P 25/03* (2016.02)

(58) Field of Classification Search
CPC ............. H02P 3/18; H02P 25/03; H02P 23/14
USPC ....................................... 318/400.15, 400.02
See application file for complete search history.

(56) References Cited

U.S. PATENT DOCUMENTS

| | | | | |
|---|---|---|---|---|
| 10,156,832 B2 * | 12/2018 | Kitamoto | ............... | G05B 13/02 |
| 11,736,049 B2 * | 8/2023 | Kitagawa | ............... | H02P 21/22 |
| | | | | 318/496 |
| 2013/0033210 A1 | 2/2013 | Suzuki et al. | | |
| 2013/0285591 A1 | 10/2013 | Suzuki | | |

(Continued)

*Primary Examiner* — Erick D Glass
(74) *Attorney, Agent, or Firm* — Precision Patents, P.C.

(57) ABSTRACT

A motor control device controls energization to a motor having two three-phase winding sets configured such that their electrical angle phase difference is $\pm(\varphi o+120\times n)°$ $(0<\varphi o\leq60°$, n is an integer). A current redistribution section of a current command value calculation unit executes "current redistribution process" when a predetermined condition is satisfied. In the current redistribution process, the current redistribution section calculates a specific maximum current value, which is the maximum value of the absolute values of the three-phase current command values in each system, for each electrical angle. The current redistribution section redistributes the current command values of the two systems so that a ratio between $I1\_max(\theta)\times(1+\alpha(\theta))$, which is the specific maximum current value of the first system after the redistribution, and $I2\_max(\theta)\times(1-\alpha(\theta))$, which is the specific maximum current value of the second system after the redistribution, approaches a predetermined target ratio.

9 Claims, 22 Drawing Sheets

(56)           References Cited

U.S. PATENT DOCUMENTS

| | | | |
|---|---|---|---|
| 2014/0054103 A1* | 2/2014 | Kezobo | G01R 31/343 |
| | | | 180/446 |
| 2014/0368150 A1* | 12/2014 | Furukawa | B62D 5/046 |
| | | | 318/564 |
| 2016/0315577 A1 | 10/2016 | Suzuki | |
| 2017/0166248 A1 | 6/2017 | Asao et al. | |
| 2019/0047613 A1 | 2/2019 | Kano et al. | |

* cited by examiner

FIRST SYSTEM LOSS (BEFORE REDISTRIBUTION)

ELECTRICAL ANGLE $\theta$ [°]

SECOND SYSTEM LOSS (BEFORE REDISTRIBUTION)

ELECTRICAL ANGLE $\theta$ [°]

DISTRIBUTION COEFFICIENT $\alpha$  ($\beta$ =1)

ELECTRICAL ANGLE $\theta$ [° ]

DISTRIBUTION COEFFICIENT $\alpha$  ($\beta$ =1.2)

ELECTRICAL ANGLE $\theta$ [° ]

FIRST SYSTEM LOSS (BEFORE REDISTRIBUTION)

ELECTRICAL ANGLE $\theta$ [° ]

SECOND SYSTEM LOSS (BEFORE REDISTRIBUTION)

ELECTRICAL ANGLE $\theta$ [° ]

DISTRIBUTION COEFFICIENT $\alpha$ ($\beta$=1)

ELECTRICAL ANGLE $\theta$ [°]

DISTRIBUTION COEFFICIENT $\alpha$ ($\beta$=1.2)

ELECTRICAL ANGLE $\theta$ [°]

MOTOR CONTROL DEVICE FOR CONTROLLING ENERGIZATION TO MOTOR HAVING TWO THREE-PHASE WINDING SETS

CROSS REFERENCE TO RELATED APPLICATIONS

This application is a continuation application of International Patent Application No. PCT/JP2022/037088 filed on Oct. 4, 2022, which designated the U.S. and based on and claims the benefits of priority of Japanese Patent Application No. 2021-164064 filed on Oct. 5, 2021. The entire disclosure of all of the above applications is incorporated herein by reference.

TECHNICAL FIELD

The present disclosure relates to a motor control device.

BACKGROUND

Conventionally, it is known that a motor control device supplies a motor, which has two sets of three-phase windings configured to have different phases from each other, with a three-phase current having a phase difference between systems corresponding to a phase difference between winding sets from the power converters in two systems.

SUMMARY

An object of the present disclosure is to provide a motor control device that reduces heat generation in the entire two systems while maintaining output torque.

A motor control device of the present disclosure controls energization of a motor having two three-phase winding sets configured such that an electrical angle phase difference between the two sets is $\pm(\varphi o + 120 \times n^\circ)$. Here, a relationship $0 < \varphi o \le 60^\circ$ is satisfied, and n is an integer.

The motor control device includes two systems of power converters, a first system and a second system, and a current command value calculation unit. The two systems of power converters supply two winding sets with a three-phase current having an inter-system phase difference corresponding to a phase difference between the winding sets. The current command value calculation unit calculates a current command value for each system based on a command torque.

The current command value calculation unit includes an amplitude sum command value calculation section, a reference amplitude calculation section, and a current redistribution section. The amplitude sum command value calculating section calculates an amplitude sum command value, which is a command value of the sum of the current amplitudes of the two systems, based on the command torque. The reference amplitude calculation section calculates a reference amplitude obtained by dividing the amplitude sum command value into two equal parts, and outputs the current command values based on the reference amplitude.

The current redistribution section executes a "current redistribution process" that redistributes the current command values of the two systems when a predetermined condition is satisfied.

In the current redistribution process, the current redistribution section calculates a specific maximum current value, which is the maximum value of the absolute values of the three-phase current command values in each system, for each electrical angle. The electrical angle is defined as ($\theta$), the specific maximum current value of the first system before the redistribution is defined as I1_max($\theta$), the specific maximum current value of the second system before the redistribution is defined as I2_max($\theta$), and a distribution coefficient for each electrical angle is defined as $\alpha(\theta)$.

The current redistribution section redistributes the current command values of the two systems so that a ratio between I1_max($\theta$)×(1+$\alpha(\theta)$), which is the specific maximum current value of the first system after the redistribution, and I2_max($\theta$)×(1−$\alpha(\theta)$), which is the specific maximum current value of the second system after the redistribution, approaches a predetermined target ratio ($\beta$).

In the current redistribution process of the present disclosure, the current command value is redistributed so that the ratio of the specific maximum current value after the redistribution of each system approaches the target ratio.

BRIEF DESCRIPTION OF THE DRAWINGS

The above and other objects, features and advantages of the present disclosure will become more apparent from the following detailed description taken in conjunction with the accompanying drawings. In the drawings.

DETAILED DESCRIPTION

Figure 1:
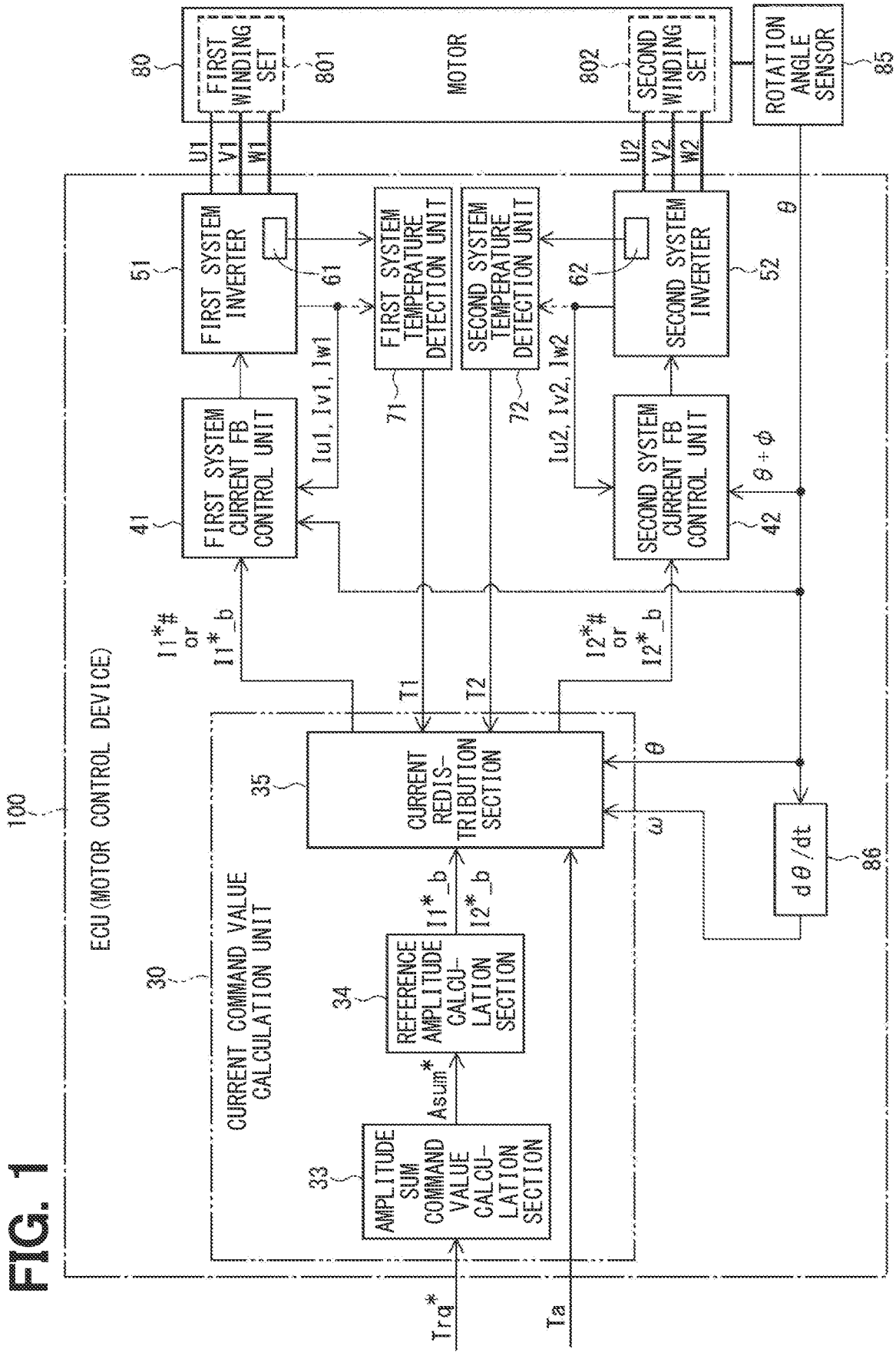
FIG. 1 is a control block diagram showing a configuration of a motor control device according to an embodiment.

In an assumable example, it is known that a motor control device supplies a motor, which has two sets of three-phase windings configured to have different phases from each other, with a three-phase current having a phase difference between systems corresponding to a phase difference between winding sets from the power converters in two systems. For example, the control device for a three-phase rotating machine limits a current command value common to both systems when the power converter or winding set of either system overheats so as to achieve both heat reduction and torque ripple suppression.

The control device for a three-phase rotating machine in another example reduces a peak of the phase current by superimposing harmonics of the fifth-order component and the seventh-order component on the first-order component of the phase current at a predetermined amplitude ratio. This control device reduces heat generation by superimposing the fifth and seventh order components at zero speed and low speed, and reduces losses by not superimposing the fifth and seventh order components at high speed, depending on the motor rotation speed.

In the conventional technique disclosed in one example, since the current is limited in common to the two systems, the torque decreases, making it impossible to output the originally required torque. The conventional technique disclosed in another example reduces heat generation in each system by reducing the peak of phase current, but does not focus on reducing heat generation in the two systems as a whole at a certain electrical angle.

In addition, in the conventional techniques disclosed in the above mentioned examples, the phase difference between systems is limited to a series of angles with an electrical angle of 30 degrees as the basic value, and there is no mention of application in cases where the basic value of the phase difference is other than 30°.

Furthermore, for example, when the heat influences from surrounding heat sources differ depending on an arrangement of the power converters in the first system and the second system, a difference may occur in a margin up to an upper limit temperature of each system. In the conventional technique disclosed in one example, the current is limited in common to both systems based on the temperature of the system with a smaller margin, so that the capacity of the system with a larger margin cannot be used effectively. The conventional technique disclosed in another example also does not take into account the difference in margin between systems.

An object of the present disclosure is to provide a motor control device that reduces heat generation in the entire two systems while maintaining output torque.

A motor control device of the present disclosure controls energization of a motor having two three-phase winding sets configured such that an electrical angle phase difference between the two sets is $\pm(\varphi o+120\times n)°$. Here, a relationship $0<\varphi o\leq60°$ is satisfied, and n is an integer. Typically, 30° is adopted as the basic value φo of the electrical angle phase difference, which is set in a range of "$0<\varphi o\leq60°$".

The motor control device includes two systems of power converters, a first system and a second system, and a current command value calculation unit. The two systems of power converter supplies two winding sets with a three-phase current having an inter-system phase difference corresponding to a phase difference between the winding sets. The current command value calculation unit calculates a current command value for each system based on a command torque.

The current command value calculation unit includes an amplitude sum command value calculation section, a reference amplitude calculation section, and a current redistribution section. The amplitude sum command value calculating section calculates an amplitude sum command value, which is a command value of the sum of the current amplitudes of the two systems, based on the command torque. The reference amplitude calculation section calculates a reference amplitude obtained by dividing the amplitude sum command value into two equal parts, and outputs the current command values based on the reference amplitude.

The current redistribution section executes a "current redistribution process" that redistributes the current command values of the two systems when a predetermined condition is satisfied. "When the predetermined condition is satisfied" is, for example, when an ambient temperature of the motor is equal to or higher than a temperature threshold, or when a rotation speed of the motor is equal to or lower than a rotation speed threshold.

In the current redistribution process, the current redistribution section calculates a specific maximum current value, which is the maximum value of the absolute values of the three-phase current command values in each system, for each electrical angle. The electrical angle is defined as ($\theta$), the specific maximum current value of the first system before the redistribution is defined as $I1\_max(\theta)$, the specific maximum current value of the second system before the redistribution is defined as $I2\_max(\theta)$, and a distribution coefficient for each electrical angle is defined as $\alpha(\theta)$.

The current redistribution section redistributes the current command values of the two systems so that a ratio between $I1\_max(\theta)\times(1+\alpha(\theta))$, which is the specific maximum current value of the first system after the redistribution, and $I2\_max(\theta)\times(1-\alpha(\theta))$, which is the specific maximum current value of the second system after the redistribution, approaches a predetermined target ratio ($\beta$). For example, the target ratio is determined based on a margin that reflects a difference between the upper limit temperature of the power converter or the winding set and the current temperature.

In the current redistribution process of the present disclosure, the current command value is redistributed so that the ratio of the specific maximum current value after the redistribution of each system approaches the target ratio. For example, when the margins of the two systems are equivalent and the target ratio β is 1, the heat generation of the two systems is equally reduced. On the other hand, when there is a difference between the margins of the two systems, preferably the current command value is redistributed so as to further reduce heat generation in the system having the smaller margin. Thereby, heat generation in the two systems as a whole can be effectively reduced.

In the redistribution calculation, the same distribution coefficient α ($\theta$) is multiplied by the value added to 1 in the first system, and multiplied by the value subtracted from 1 in the second system, so the total output torque of the two systems is roughly maintained before and after redistribution. Therefore, it is possible to prevent a decrease in torque due to output limitation common to the two systems as in one example.

One Embodiment

A motor control device according to one embodiment will be described with reference to the accompanying drawings. The motor control device of the present embodiment is applied, for example, as a device that controls energization to a two-system three-phase motor that operates a pad of a caliper in an electric brake of a vehicle. Hereinafter, the device configuration of the present embodiment will be explained all at once, and specific control will be explained separately in three examples.
[Control Configuration of Motor Control Device (ECU)]

Figure 2:
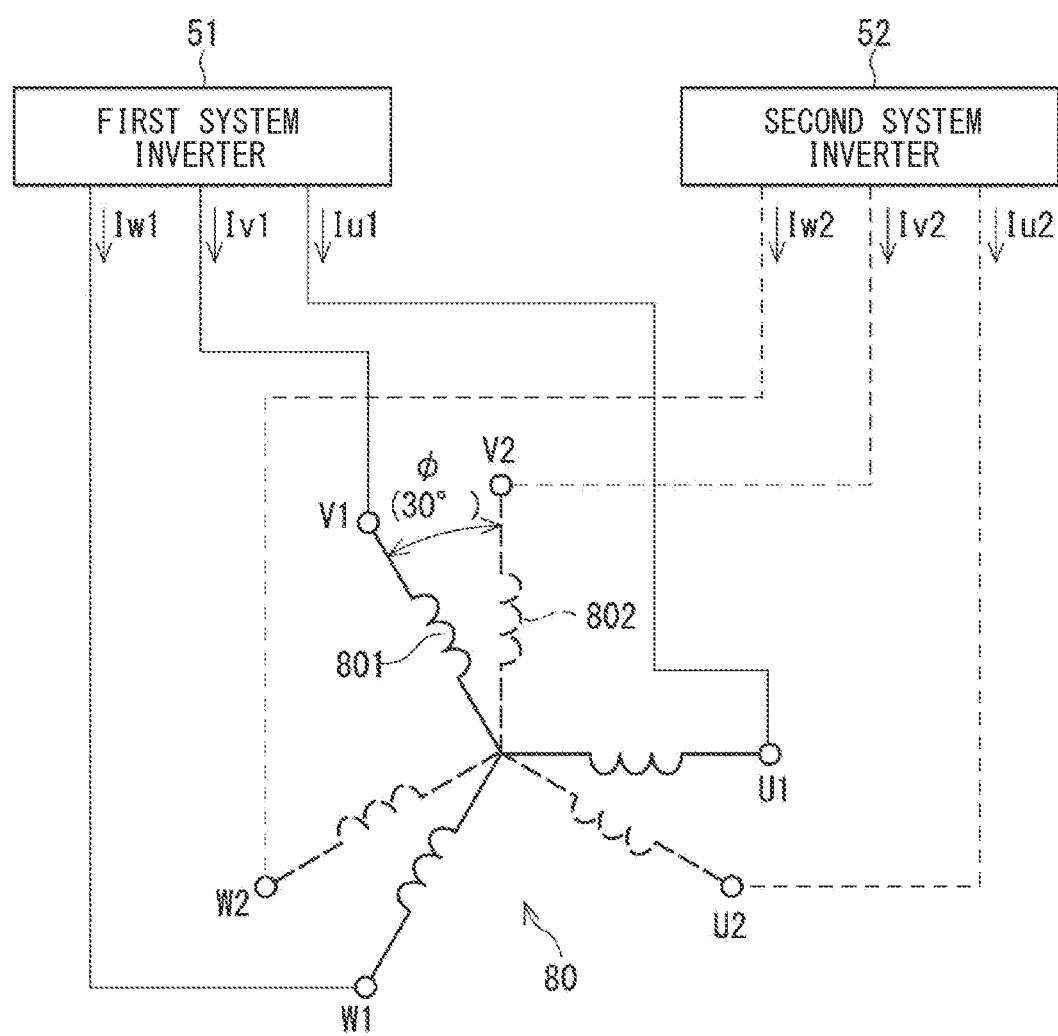
FIG. 2 is a schematic diagram showing a configuration of two systems of three-phase motor.
Figure 3:
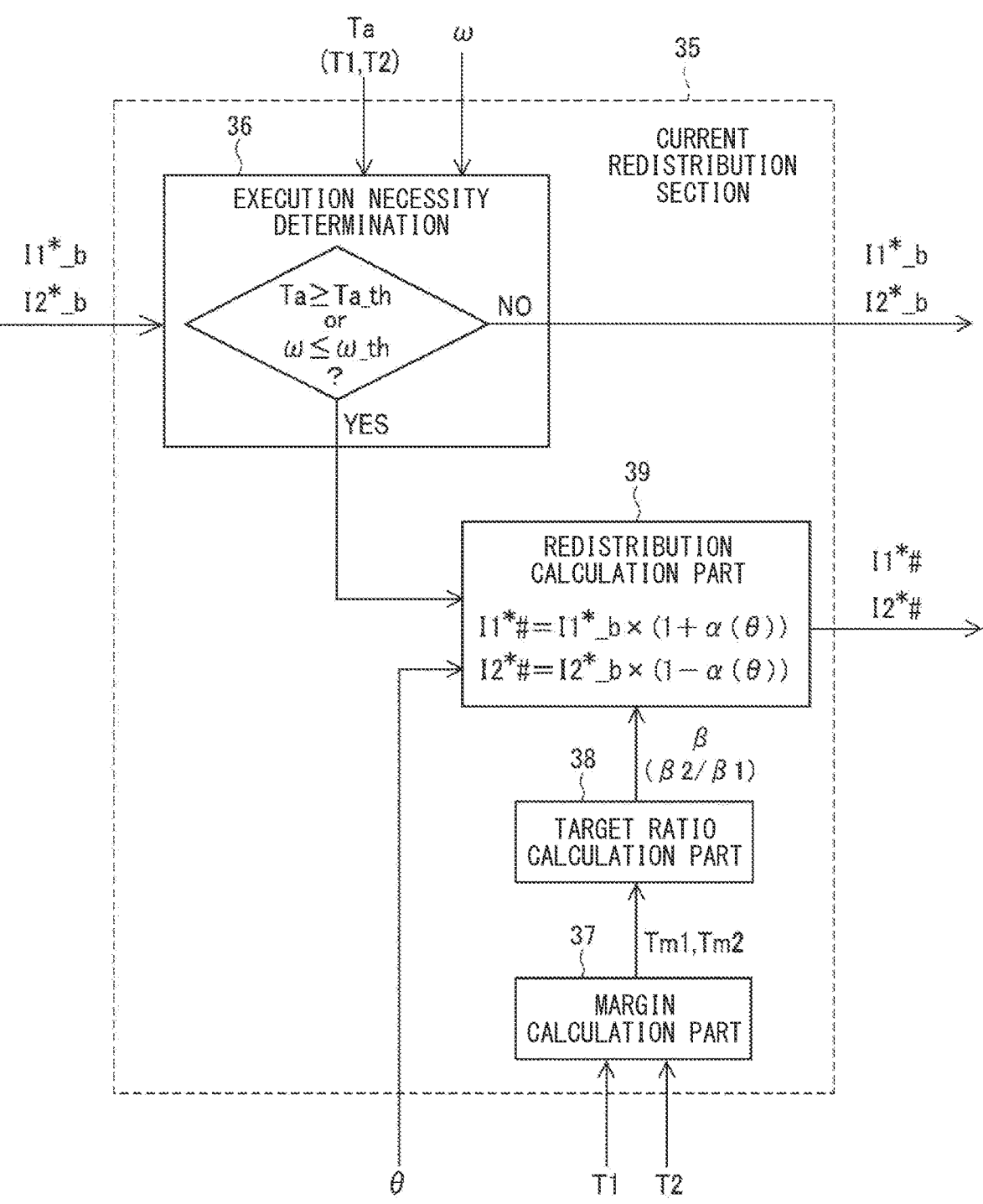
FIG. 3 is a detailed control block diagram showing a current redistribution section.

The control configuration of ECU 100 functioning as a "motor control device" will be described with reference to FIGS. 1 to 4B. The ECU 100 supplies three-phase current to the two winding sets 801 and 802 from the inverters 51 and 52 as two systems of "power converters" based on a command torque Trq* commanded from the host vehicle control circuit so as to cause a motor 80 to generate torque. In FIGS. 1 to 3, the components of the first system are marked with "1" at the end of the reference numerals, and the components of the second system are marked with "2" at the end of the reference numerals.

The ECU 100 is configured mainly by a microcomputer and the like and includes a CPU, a ROM, a RAM, an I/O, a bus line for connecting those configurations, and so on. The ECU 100 executes software processing by executing a program stored in advance by the CPU, and control by hardware processing by a dedicated electronic circuit.

As shown in FIG. 1, the ECU 100 includes a current command value calculation unit 30, a first system current feedback ("FB" in the figure) control unit 41 and an inverter 51, and a second system current feedback control unit 42 and an inverter 52. Further, the ECU 100 of the present embodiment includes temperature detection units 71 and 72 for each system.

The current command value calculation unit 30 calculates a current command value for each system based on a command torque Trq*, and outputs it to the current feedback control units 41 and 42. The detailed configuration of the current command value calculation unit 30 will be described later. The current command value calculation unit 30 outputs the current command values I1*_b and I2*_b before a redistribution, when not executing "current redistribution process" to be described later. When executing the "current redistribution process", the current command value calculation unit 30 outputs the current command values I1*# and I2*# after the redistribution.

In the explanation of the current command value calculation unit 30, the current command values I1*_b, and I2*_b before the redistribution, or the current command values I1*#, and I2*# after the redistribution, are used as three-phase current command values. However, in general, a dq-axis current command value is used in current feedback control of a three-phase motor. Although the present embodiment does not refer to the dq-axis current control, it is only necessary to understand that, for example, a conversion from a three-phase current command value to a dq-axis current command value is performed between the current redistribution section 35 and the current feedback control units 41 and 42.

The first system current feedback control unit 41 calculates a drive signal of the first system inverter 51 based on the phase currents Iu1, Iv1 of the first system, and Iw1 detected by current sensors (not shown) and an electrical angle θ detected by the rotation angle sensor 85. The current feedback control unit 42 of the second system calculates a drive signal of the second system inverter 52 based on the phase currents Iu2, Iv2, and Iw2 of the second system detected by current sensors (not shown) and an angle (θ+φ) obtained by adding the phase difference to the electrical angle detected by the rotation angle sensor 85.

The current feedback control is a well-known technique, as disclosed in Japanese Patent No. 5397785 corresponding to US publication: U.S. Pat. No. 8,766,577B2, so a description thereof will be omitted.

As shown in FIG. 2, the motor 80 is configured as a double-winding motor in which two winding sets 801 and 802 are coaxially arranged. The first winding set 801 includes three-phase windings of U1 phase, V1 phase, and W1 phase, and the second winding set 802 includes three-phase windings of U2 phase, V2 phase, and W2 phase. The first winding set 801 and the second winding set 802 are configured such that their electrical angle phase difference φ is expressed by an equation (1). The equation (1) expresses a generalized phase difference due to three-phase symmetry and swapping of advancing and delaying sides of the two systems based on a basic value φo of the phase difference.

$$\varphi = \pm(\varphi o + 120 \times n)°(0 < \varphi o \le 60°, n \text{ is an integer}) \tag{1}$$

Similar to Japanese Patent No. 5397785, 30° is typically adopted as the basic value φo of the electrical angle phase difference. In the present embodiment as well, the motor 80 in which the electrical angle phase difference between the two winding sets 801 and 802 is 30° is mainly assumed. However, as described in the column "Other Embodiments", the technical idea of the present embodiment is also applicable to motors in which the electrical angle phase difference between the two winding sets 801 and 802 is other than 30 degrees.

The two systems of inverters 51 and 52 energize the two winding sets 801 and 802 with three-phase currents having a phase difference φ between systems corresponding to the phase difference φ between the winding sets 801 and 802. Therefore, when the amplitude of the sinusoidal current is 1, the phase currents Iu1, Iv1, Iw1, Iu2, Iv2, and Iw2 supplied to each system are expressed by equations (2.1a) to (2.2c). An unit of phase is [°].

$$Iu1 = \sin\theta \tag{2.1a}$$
$$Iv1 = \sin(\theta - 120) \tag{2.1b}$$
$$Iw1 = \sin(\theta - 240) \tag{2.1c}$$
$$Iu2 = \sin(\theta + 30) \tag{2.2a}$$
$$Iv2 = \sin(\theta - 90) \tag{2.2b}$$
$$Iw2 = \sin(\theta - 210) \tag{2.2c}$$

Returning to FIG. 1, the temperature detection units 71 and 72 detect or estimate the current temperatures T1 and T2 of the inverters 51 and 52 or winding sets 801 and 802 of each system. For example, the temperature detection units 71 and 72 may detect the current temperatures T1 and T2 of each system using temperature sensors 61 and 62 provided near the elements of the inverters 51 and 52 of each system. Alternatively, the temperature detection units 71 and 72 may calculate the temperature rise from the initial temperature using Joule heat based on the phase current, and estimate the current temperatures T1 and T2. In the present specification, a functional unit including the configuration for estimating temperature from phase current is referred to as a "temperature detection unit."

A differentiator 86 calculates an electrical angular velocity ω by differentiating the electrical angle θ. Since the electrical angular velocity ω is converted to the motor rotation speed by multiplying it by a proportionality constant, it is referred to as "rotation speed ω" in the present specification. In addition to the command torque Trq*, the electrical angle θ, the rotational speed ω, the current temperatures T1 and T2 of each system, and the ambient temperature Ta of the motor 80 are input to the current command value calculation unit 30. As the ambient temperature Ta of the motor 80, environmental temperature information acquired by another control device of the vehicle may be used. Alternatively, an average value or a selected value based on the current temperatures T1 and T2 of each system may be used as the ambient temperature Ta.

The current command value calculation unit 30 includes an amplitude sum command value calculation section 33, a reference amplitude calculation section 34, and a current redistribution section 35. The amplitude sum command value calculating section 33 calculates an amplitude sum command value Asum*, which is a command value of the sum of the current amplitudes of the two systems, based on the command torque Trq*. The reference amplitude calculation section 34 calculates a reference amplitude obtained by dividing the amplitude sum command value Asum* into two equal parts, and outputs the current command values I1*_b and I2*_b based on the reference amplitude. In FIGS. 6 to 22 for explaining the embodiments, the symbol for reference amplitude is not used, and the reference amplitude is shown as 1.

The current redistribution section 35 attempts to reduce heat generation in the two systems as a whole by executing a "current redistribution process" that redistributes the current command values of the two systems when a predetermined condition is satisfied. Specifically, as shown in FIG. 3, the current redistribution section 35 includes an execution necessity determination part 36, a margin calculation part 37, a target ratio calculation part 38, and a redistribution calculation part 39.

The execution necessity determination part 36 determines whether or not the current redistribution process needs to be executed depending on whether or not "the predetermined condition is satisfied". In the present embodiment, it is determined that each of the following two conditions is satisfied. [Condition 1] The ambient temperature Ta of the motor 80 is greater than or equal to the temperature threshold Ta_th. [Condition 2] The rotation speed w of the motor 80 is less than or equal to the rotation speed threshold value ω_th.

When the ambient temperature Ta is relatively high, the margin for the upper limit temperature of the inverter elements and the like becomes smaller as a whole, so there is a greater need to reduce heat generation. Furthermore, at zero rotation or low rotation, energization to a specific phase continues for a long time, and the need to reduce heat generation will increase. When at least one of Condition 1 and Condition 2 is satisfied, the redistribution calculation part 39 of the current redistribution section 35 executes the current redistribution process. In other cases, namely, when at least one of Condition 1 and Condition 2 is not satisfied, the current redistribution section 35 does not execute the current redistribution process and directly outputs the current command values I1*_b and I2*_b before the redistribution.

The margin calculation part 37 acquires the current temperatures T1 and T2 of each system, and calculates margins Tm1 and Tm2 for each system, which reflect the difference between the upper limit temperature of the inverters 51 and 52 or the winding sets 801 and 802 and the current temperature. The target ratio calculation part 38 determines the target ratio β based on the margins Tm1 and Tm2, and outputs it to the redistribution calculation part 39.

A relationship between the margin difference (Tm1−Tm2) between systems and the target ratio β will be described with reference to FIGS. 4A and 4B. When the margins Tm1 and Tm2 of the two systems are equal, the target ratio β is 1. The following temperature example (unit:[° C.]) is assumed as an upper limit temperature Tmax common to the two systems, a first system current temperature T1, a second system current temperature T2, a first system margin Tm1, and a second system margin Tm2. In this example, a difference between the upper limit temperature Tmax and the current temperatures T1 and T2 of each system is calculated as the margins Tm1 and Tm2.

Tmax is equal to 150 (Tmax=150).
T1 is equal to 70 (T1=70).
T2 is equal to 110 (T2=110).
Tm1 is equal to 80 (150−70).
Tm2 is equal to 40 (150−110).

For example, the target ratio ß is calculated using an equation (3). When k is equal to 0.005 (k=0.005) and N is equal to 1 (N=1), and when Tm1 is equal to 80 and Tm2 is equal to 40, β becomes 1.2.

$$\beta = 1 + k \times (Tm1 - Tm2)^N \tag{3}$$

Figure 4A:
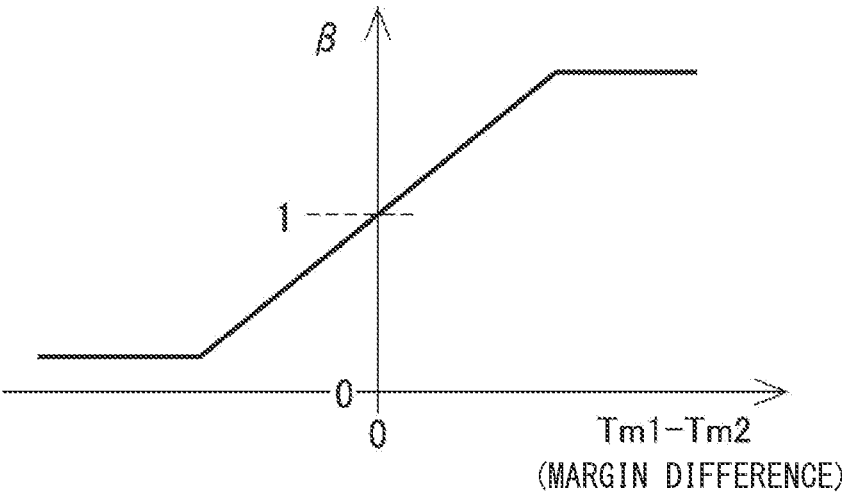
FIG. 4A is an example of a map of a margin difference (Tm1−Tm2) between systems and a target ratio $\beta$.
Figure 4B:
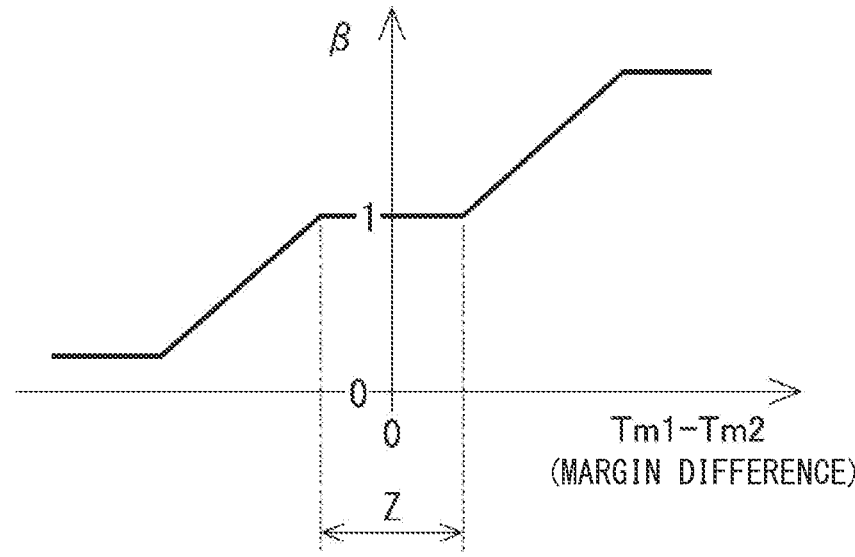
FIG. 4B is another example of a map of a margin difference (Tm1−Tm2) between systems and a target ratio $\beta$.

When k is greater than 0 (k>0) and N is equal to 1 (N=1), as shown in FIG. 4A, the target ratio β is expressed by a straight line having an intercept of 1 and a positive slope with respect to the margin difference (Tm1−Tm2). Here, a lower limit value of the target ratio β may be set so that β is greater than 0 (β>0), and an upper limit value of the target ratio β may also be set. Further, as shown in FIG. 4B, a dead zone Z in which the target ratio β is constant at 1 may be set in a region where an absolute value |Tm1−Tm2| of the margin difference is equal to or less than a predetermined value.

The redistribution calculation part 39 calculates a specific maximum current value, which is the maximum value among the absolute values of the three-phase current command values in each system, for each electrical angle θ, and then calculates the distribution coefficient α(θ) from the specific maximum current value and the target ratio β. Specific calculations will be described later with reference to FIG. 6. Then, the redistribution calculation part 39 uses a distribution coefficient α(θ) and calculates the current command values I1*# and I2*# after redistribution according to equations (4.1) and (4.2). In this calculation, the same distribution coefficient α (θ) is multiplied by the value added to 1 in the first system, and multiplied by the value subtracted from 1 in the second system, so the total output torque of the two systems is roughly maintained before and after redistribution.

$$I1^* \# = I1^*\_b \times (1 + \alpha(\theta)) \tag{4.1}$$

$$I2^* \# = I2^*\_b \times (1 - \alpha(\theta)) \tag{4.2}$$

Equations (4.1) and (4.2) collectively describe three-phase current command values. When described for each phase, it is expressed as equations (4.1a) to (4.2c).

$$Iu1^* \# = Iu1^*\_b \times (1 + \alpha(\theta)) \tag{4.1a}$$

$$Iv1^* \# = Iv1^*\_b \times (1 + \alpha(\theta)) \tag{4.1b}$$

$$Iw1^* \# = Iw1^*\_b \times (1 + \alpha(\theta)) \tag{4.1c}$$

$$Iu2^* \# = Iu2^*\_b \times (1 - \alpha(\theta)) \tag{4.2a}$$

$$Iv2^* \# = Iv2^*\_b \times (1 - \alpha(\theta)) \tag{4.2b}$$

$$Iw2^* \# = Iw2^*\_b \times (1 - \alpha(\theta)) \tag{4.2c}$$

Figure 5:
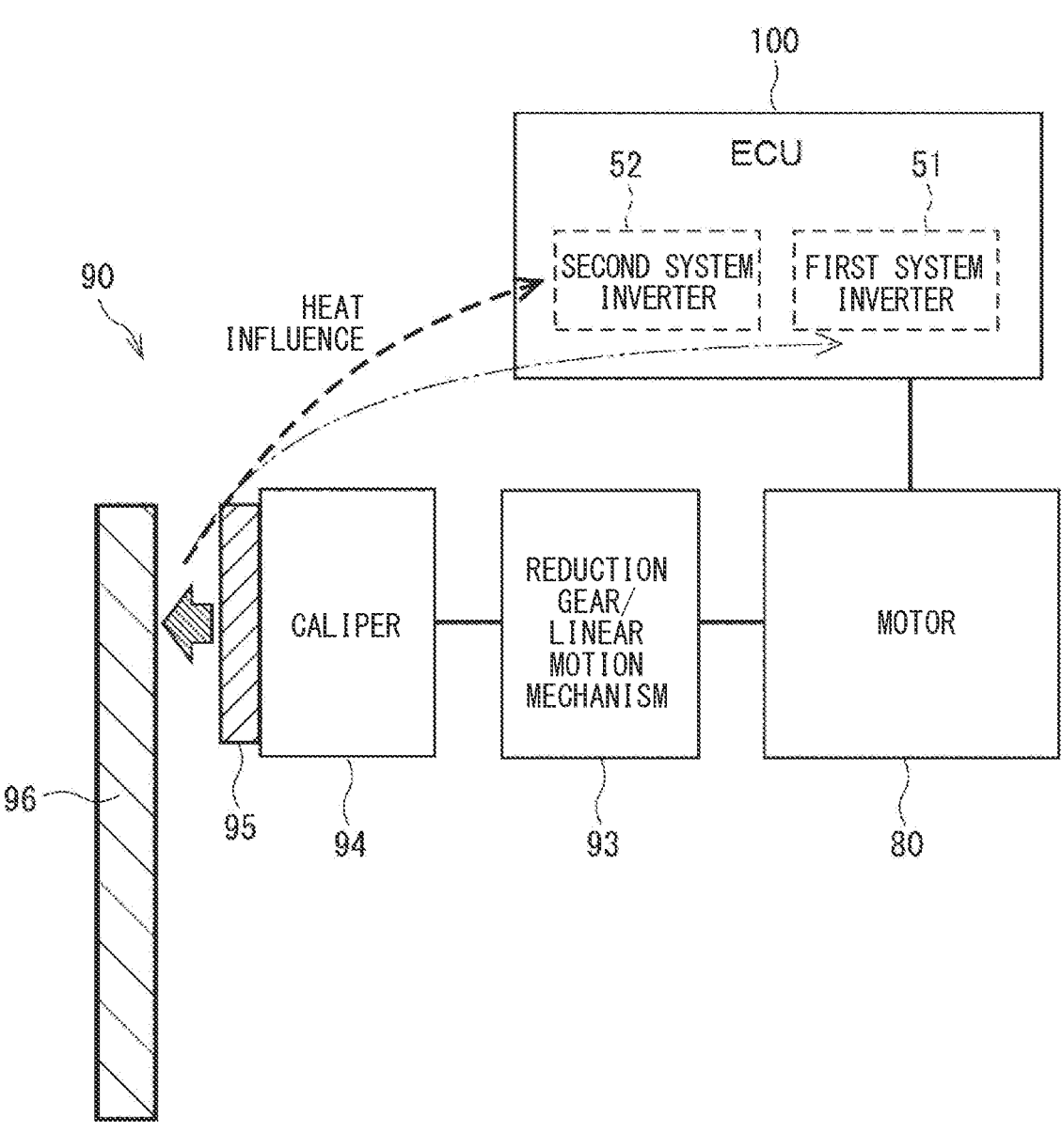
FIG. 5 is a schematic diagram of a motor applied to an electric brake.

Here, with reference to FIG. 5, a specific situation in which a difference in margin between systems occurs in a two-system motor applied to an electric brake will be described. The electric brake 90 is provided corresponding to each wheel of the vehicle. When a pad 95 of a caliper 94 moves and comes into contact with a disc 96, the rotation of the disc 96 is braked due to friction. The torque of the motor 80 operates the pad 95 of the caliper 94 via a reduction gear/linear motion mechanism 93.

In the ECU 100 that controls the energization of the motor 80, the first system inverter 51 and the second system inverter 52 are arranged separately in each area on the board. For example, assume that the first system inverter 51 is placed on the side far from the pad 95, and the second system inverter 52 is placed on the side close to the pad 95. When frictional heat of the pad 95 is generated during braking, the thermal effect on the second system inverter 52 is greater than the thermal effect on the first system inverter 51. As described above, there may be a difference in margin between the two systems of inverters 51 and 52 depending on the relative arrangement, wind direction, and the like.

In addition, in a brushless motor, a positional relationship between the stator windings and the pad 95 does not change even during rotation, so depending on how the windings are wound and arranged, differences in thermal effects may occur between systems or phases of the windings. For example, it is assumed that the V2 phase of the second system is most affected by heat, and the U1 phase and V1 phase of the first system are the next most affected by heat. Basically, it is assumed that the margin of the system that includes the parts most affected by heat is smaller. However, the margin of each system may be determined by comprehensively considering the thermal effects on the three phases.

The motor for the electric brake continues to output torque that balances the external load, and may be driven in a locked (zero rotation) state or in an extremely low speed rotation state. The present embodiment executes the current redistribution process for the purpose of reducing heat generation in a two-system motor used particularly in such a situation. Next, a specific example of current redistribution process will be described.

First Embodiment

Figure 6:
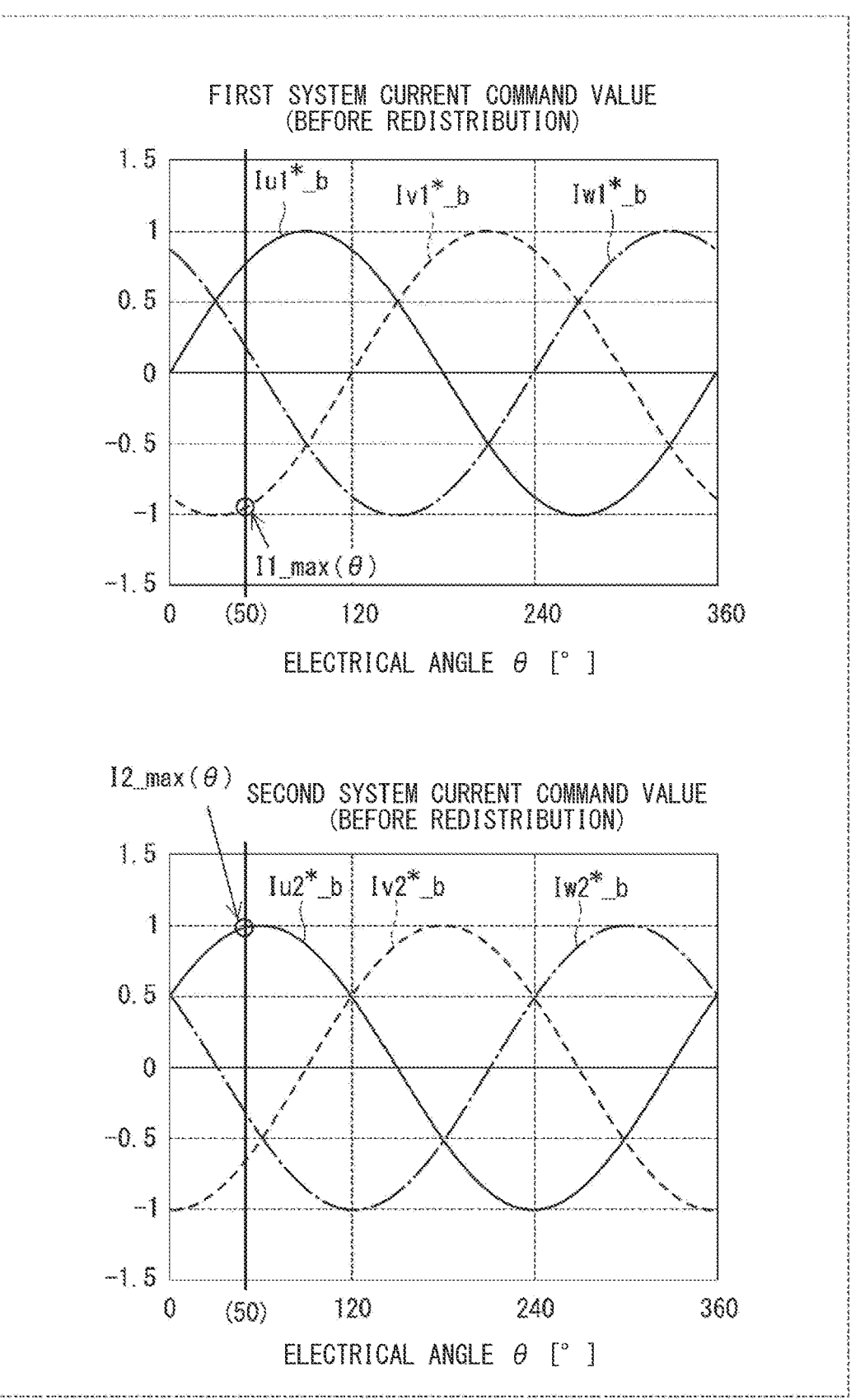
FIG. 6 is a waveform diagram showing a current command value before redistribution in a first embodiment.
Figure 7:
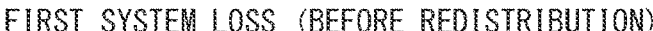
FIG. 7 is a waveform diagram showing a loss before redistribution.
Figure 7:
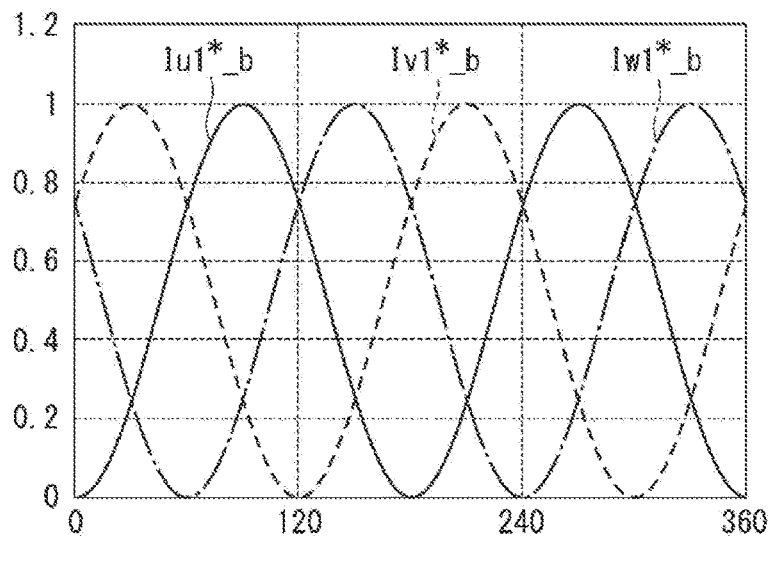
Figure 7:
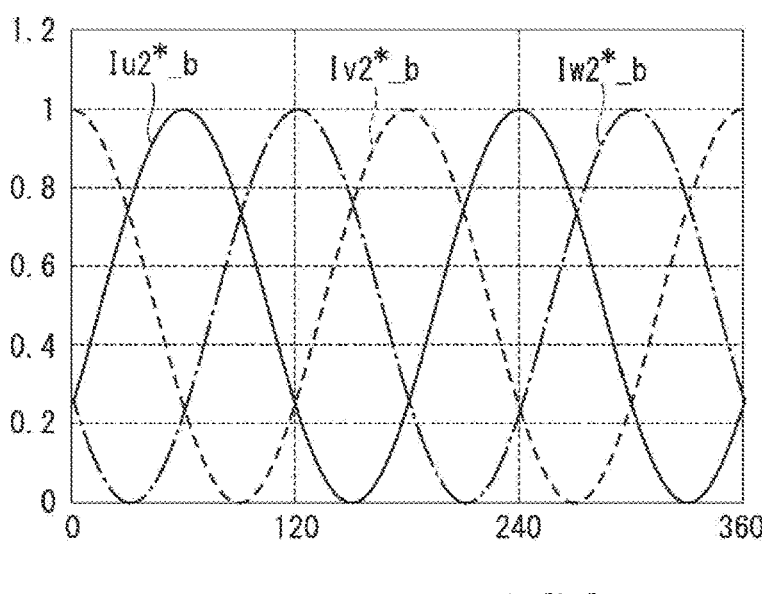

Next, an example in which the current redistribution process is applied to a sinusoidal current command value will be described as a first example with reference to FIGS. 6 to 14. FIGS. 6 and 7 show the current command value before redistribution of the two systems having a phase difference 30° between systems and the waveform of the loss proportional to the square of the current. Hereinafter, a diagram in which the currents or losses of two systems are arranged vertically will be treated as one diagram. The vertical axes of current waveform diagrams including FIG. 6 indicate current values when the reference amplitude is set to 1, and the description of axis labels are omitted. Similarly, the vertical axes of loss waveform diagrams including FIG. 7 indicate the loss (power value) when the maximum value of loss due to a current with a reference amplitude of 1 is set to 1, and the description of axis label is omitted.

Referring to FIG. 6, the principle of current redistribution process by the redistribution calculation part 39 of the current redistribution section 35 will be described. The redistribution calculation part 39 calculates the specific maximum current values I1_max(θ) and I2_max(θ) of each system for each electrical angle θ using equations (5.1) and (5.2). The specific maximum current values I1_max(θ) and I2_max(θ) are the maximum values of the absolute values of the three-phase current command values in each system.

$$I1\_max(\theta) = MAX(|Iu1|, |Iv1|, |Iw1|) \tag{5.1}$$

$$I2\_max(\theta) = MAX(|Iu2|, |Iv2|, |Iw2|) \tag{5.2}$$

As shown in FIG. 6, for example, when the electrical angle θ is approximately 50°, the current command value of the W1 phase in the first system becomes the specific maximum current value I1_max(θ), and the current command value of the U2 phase in the second system becomes the specific maximum current value I2_max(θ).

When the ratio of the specific maximum current values of the two systems after the redistribution matches the target ratio β, an Equation (6) holds true. The redistribution calculation part 39 calculates a distribution coefficient α(θ) for each electrical angle θ using an Equation (7) so that the Equation (6) holds true.

$$I1\_max(\theta) \times (1 + \alpha(\theta)) = \beta \times I2\_max(\theta) \times (1 - \alpha(\theta)) \tag{6}$$

$$\alpha(\theta) = -(I1\_max(\theta) - \beta \times I2\_max(\theta))/(I1\_max(\theta) + \beta \times I2\_max(\theta)) \tag{7}$$

The redistribution calculation part 39 redistributes the current command values of the two systems according to the equations (4.1) and (4.2) using the calculated distribution coefficient α(θ), and outputs the current command value I1*# and I2*# after the redistribution.

The above is the basic explanation of the current redistribution process. However, instantaneous calculation results are output in response to instantaneous input, and high-speed calculation is required, especially at high rotations. Therefore, it is basically assumed to be applied at zero rotation or low rotation, where the change in electrical angle is sufficiently slow with respect to the calculation cycle of the current command value.

In addition, when the current command value is expressed by a sine wave function, the specific maximum current values I1_max(θ) and I2_max(θ) for each electrical angle θ are known, and the distribution coefficient α(θ) can be calculated theoretically according to the target ratio β using equation (7). Therefore, the redistribution calculation part 39 may directly calculate the redistributed current command values I1*# and I2*# from the electrical angle θ using a map of distribution coefficient α(θ) shown in FIGS. 8A and 8B. The calculation load is reduced.

Figure 8A:
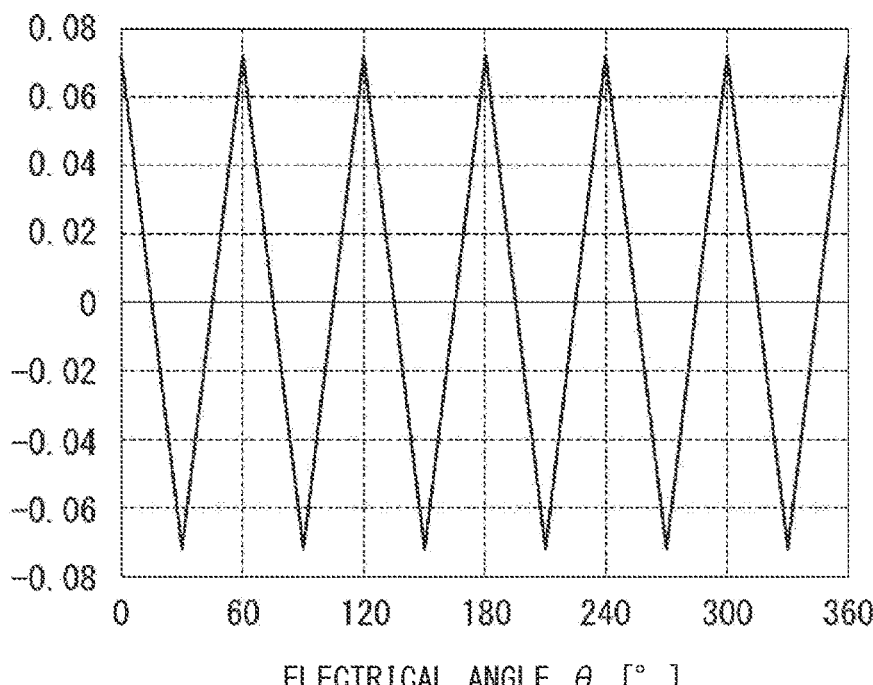
FIG. 8A is an $\alpha$ map when $\beta=1$ in the first embodiment.
Figure 8B:
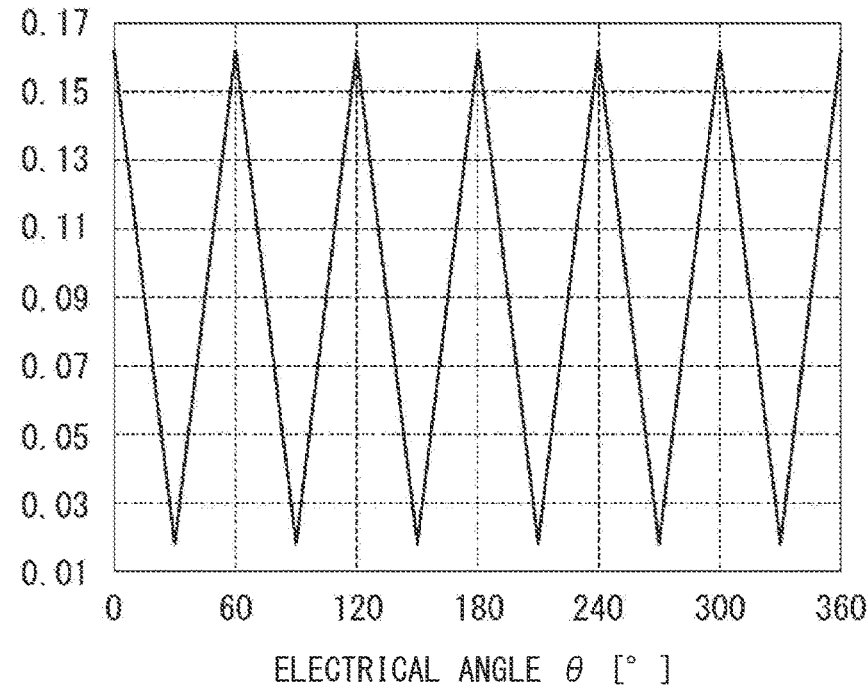
FIG. 8B is an $\alpha$ map when $\beta=1.2$ in the first embodiment.

Hereinafter, "map of distribution coefficient α (θ)" will be abbreviated as "α map". Further, in the specification, "distribution coefficient" and "target ratio" may be omitted and only the symbols α(θ) and β may be used. When β is equal to 1 (β=1) as shown in FIG. 8A, α(θ) increases and decreases six times in one period of electrical angle with a width of ±0.07 centered at 0. When β is equal to 1.2 (β=1.2) shown in FIG. 8B, α(θ) increases and decreases six times in one period of electrical angle within a range of approximately 0.09±0.07.

Figure 9:
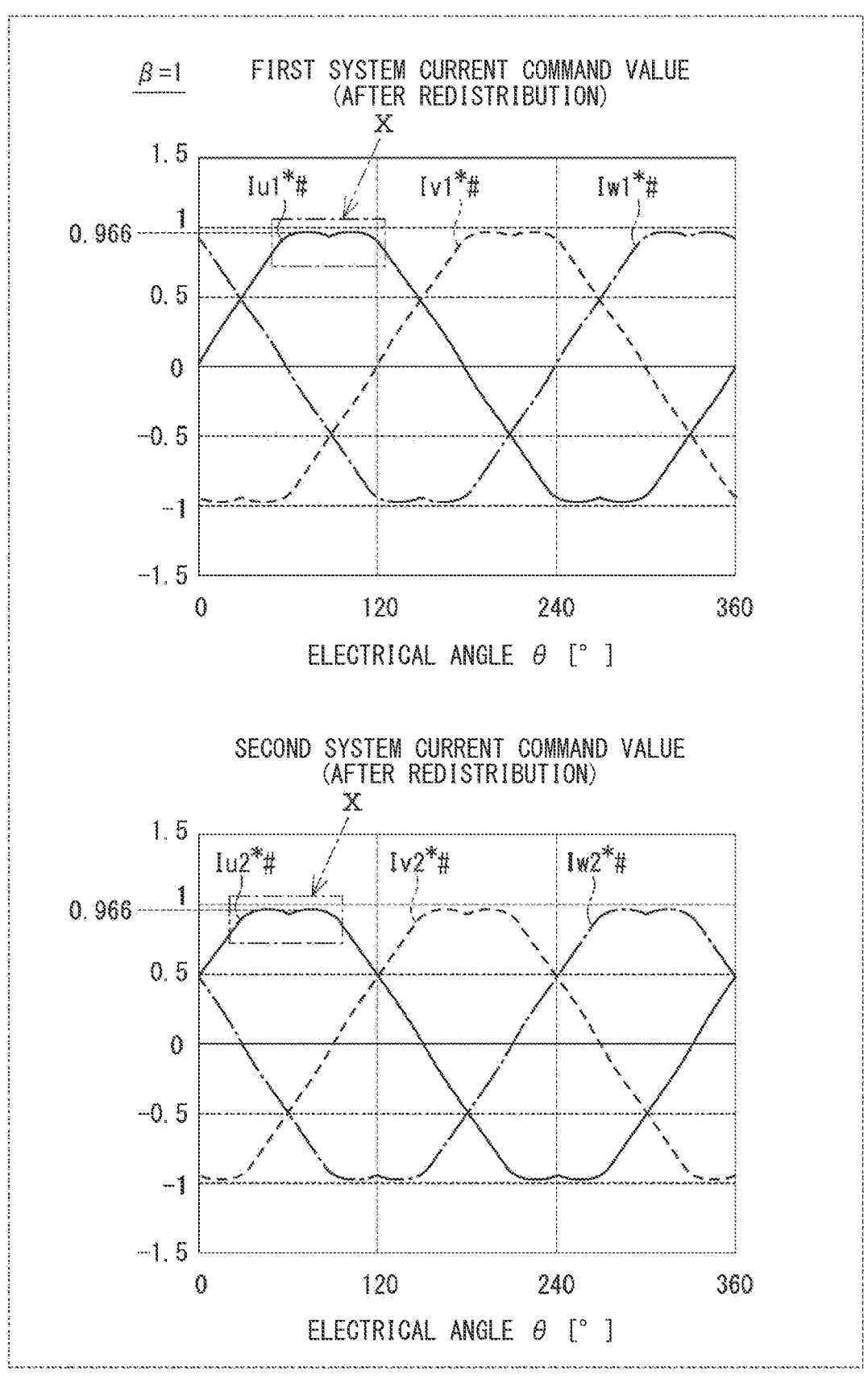
FIG. 9 is a waveform diagram of the current command value ($\beta=1$) after redistribution of the first embodiment.
Figure 10:
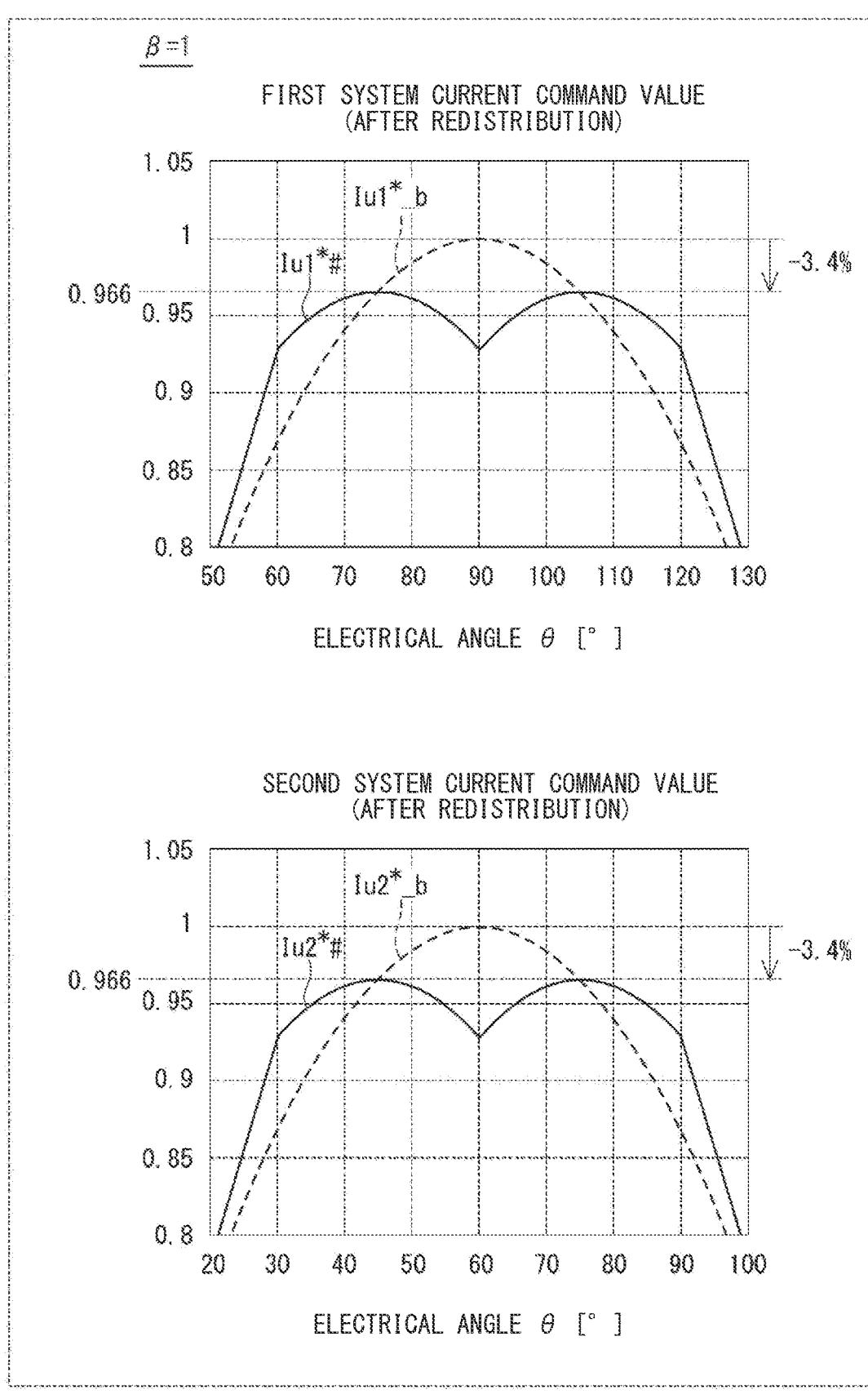
FIG. 10 is an enlarged view of the U1 phase and U2 phase current peak portions in FIG. 9.
Figure 11:
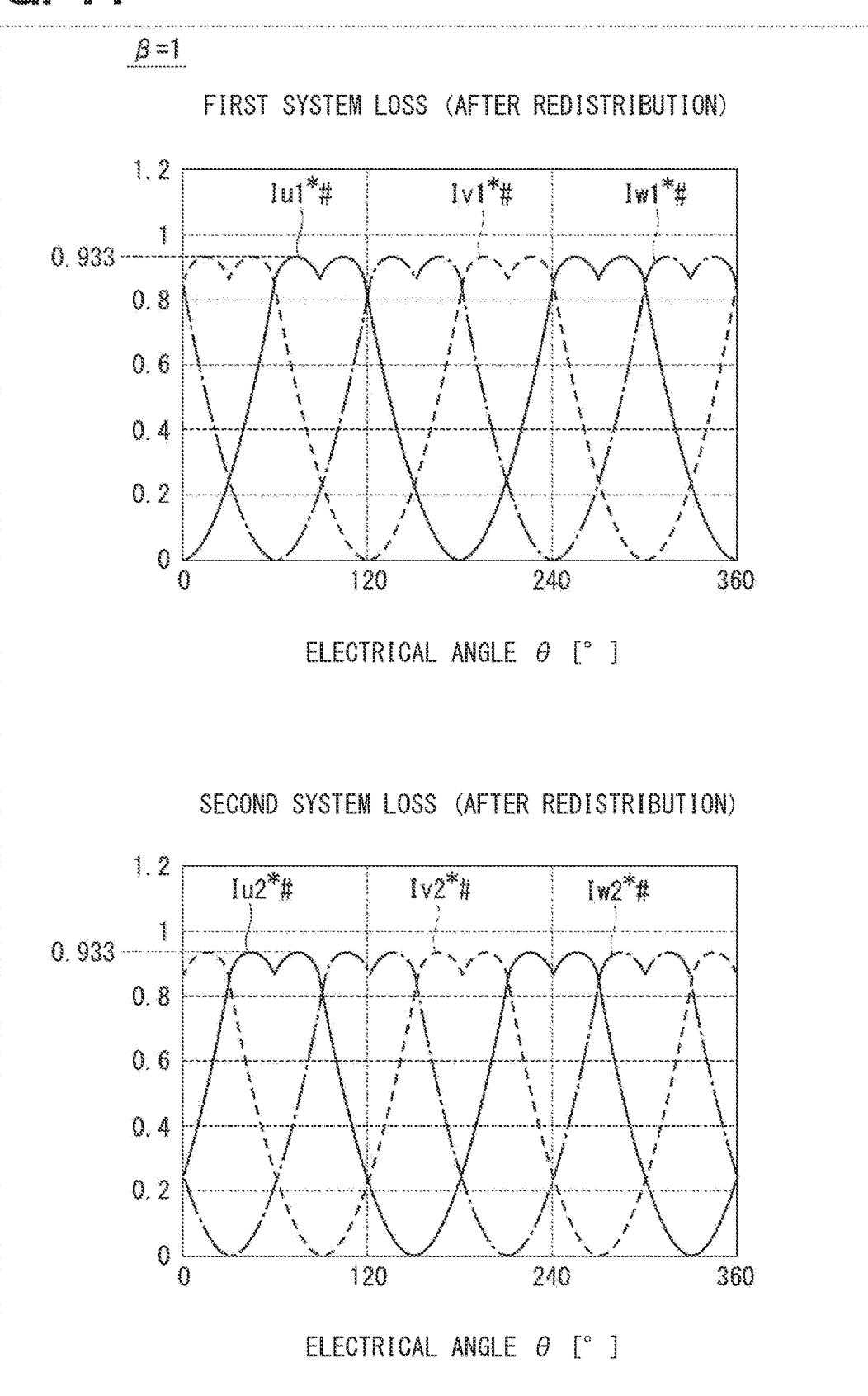
FIG. 11 is a waveform diagram showing a loss ($\beta=1$) after redistribution.

FIG. 9 shows the waveform of the current command value after the redistribution when β is equal to 1 (β=1). In this case, the current command value is evenly redistributed to the first system and the second system, which have the same margin. FIG. 10 shows an enlarged view of the current peak portions of the U1 phase and U2 phase in FIG. 9. The current peak is equally reduced by about 3.4% in both the first system and the second system. FIG. 11 shows the loss waveform after the redistribution when β is equal to 1 (β=1). The loss peak is equally reduced by about 6.7% in both the first system and the second system.

Figure 12:
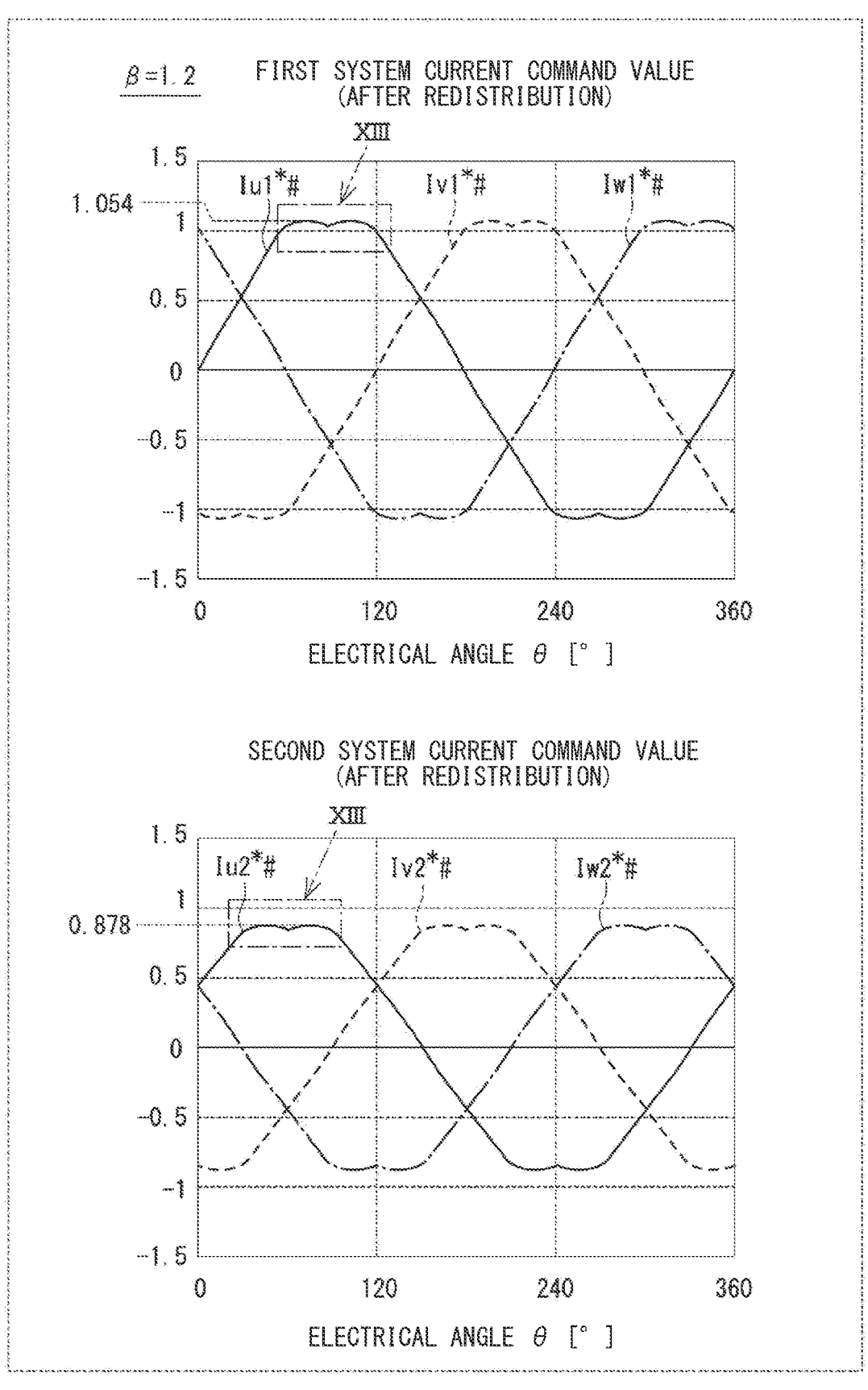
FIG. 12 is a waveform diagram of the current command value ($\beta=1.2$) after redistribution of the first embodiment.
Figure 13:
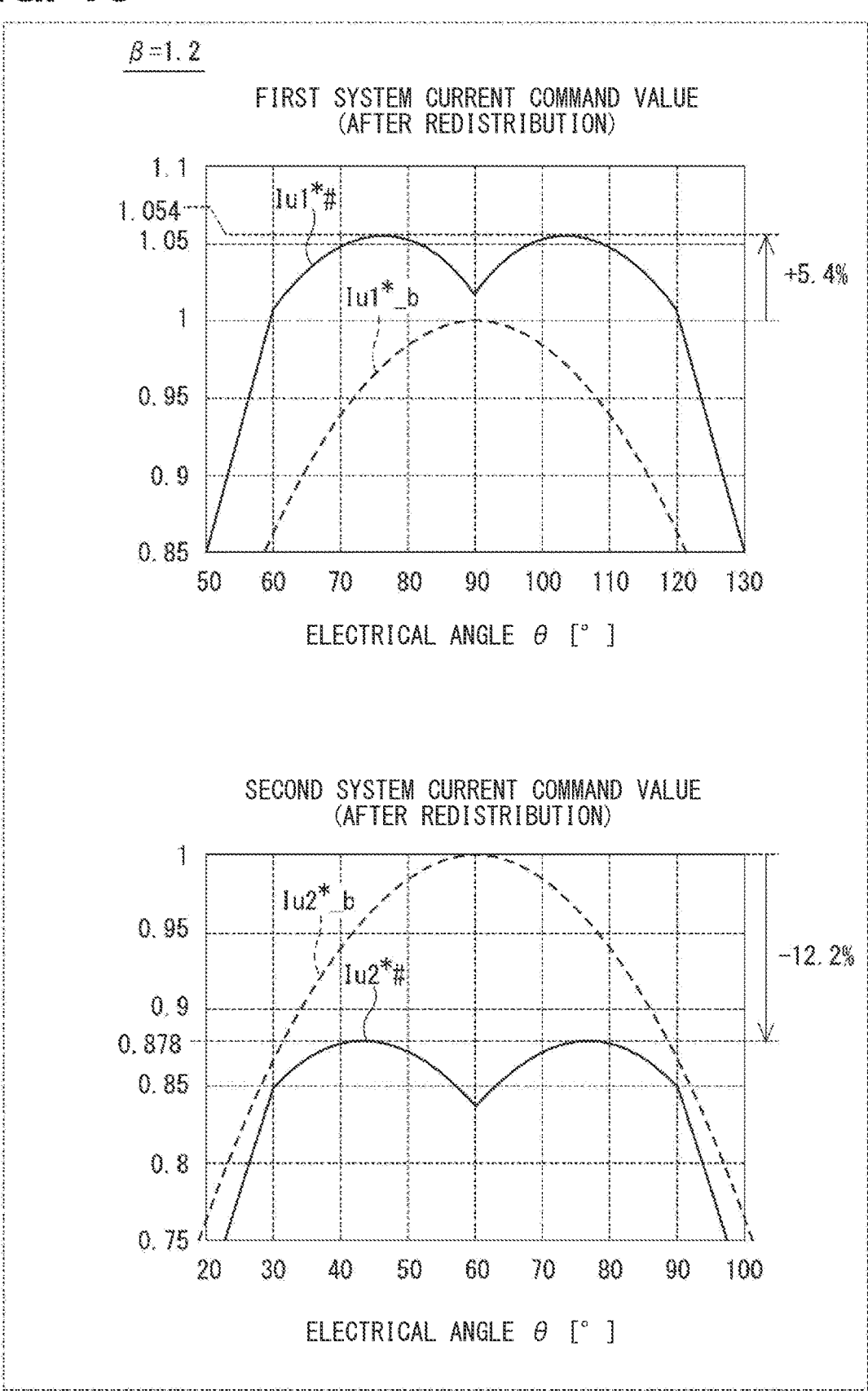
FIG. 13 is an enlarged view of the U1 phase and U2 phase current peak portions in FIG. 12.
Figure 14:
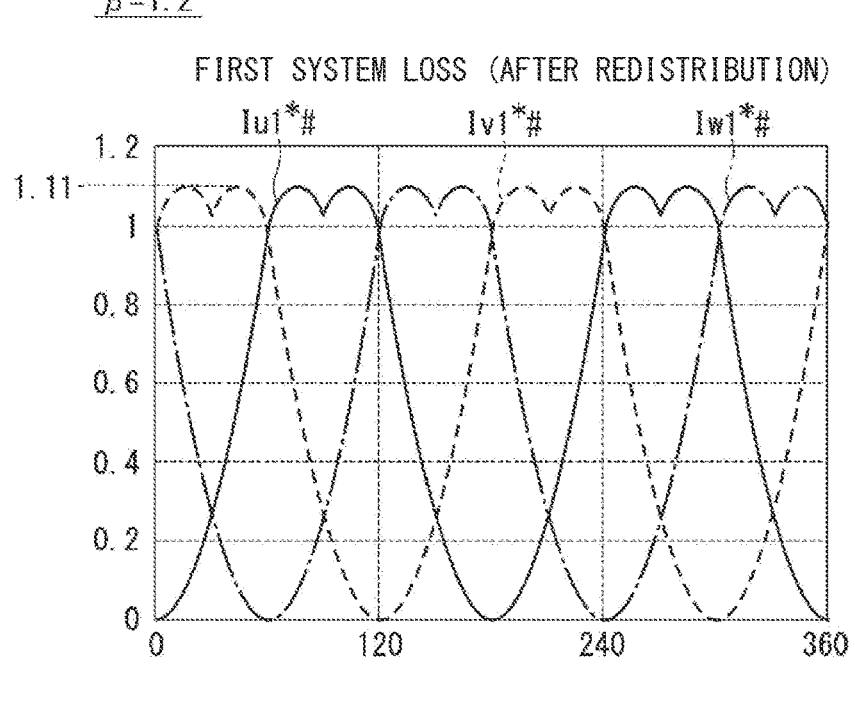
FIG. 14 is a waveform diagram showing a loss ($\beta=1.2$) after redistribution.
Figure 14:
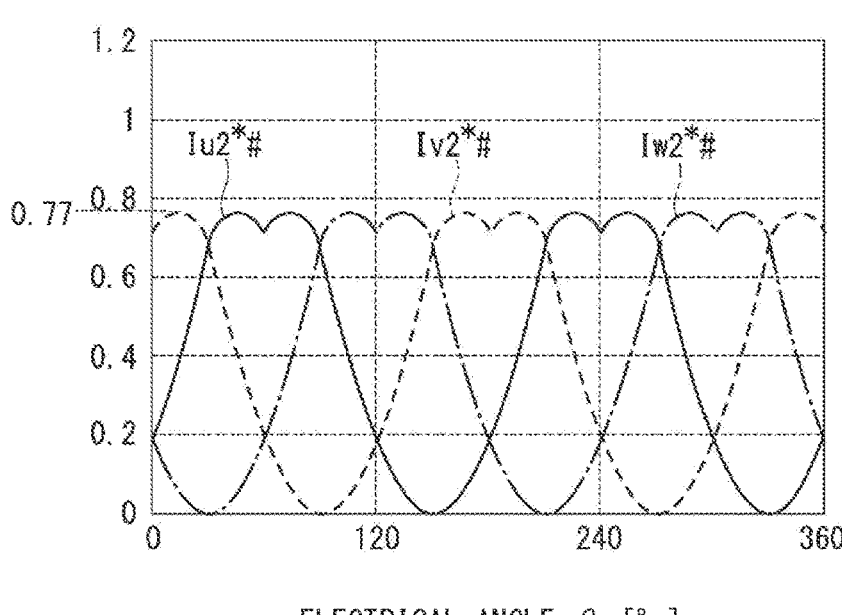

FIG. 12 shows the waveform of the current command value after the redistribution when β is equal to 1.2 (β=1.2). In this case, the current command value is redistributed so that the heat generation of the second system, which has a relatively small margin, is further reduced. FIG. 13 shows an enlarged view of the current peak portions of the U1 phase and U2 phase in FIG. 12. The current peak of the first system increases by about 5.4%, and the current peak of the second system decreases by about 12.2%. FIG. 14 shows the loss waveform after the redistribution when β is equal to 1.2 (β=1.2). The loss peak of the first system increases by about 11%, and the loss peak of the second system decreases by about 23%.

Second Embodiment

Next, with reference to FIGS. 15 and 16, an embodiment will be described as a second embodiment in which the method for determining the target ratio based on the margin is different from the first embodiment. In the second embodiment, the equations (8) and (9) using target coefficients β1 (>0) and β2 (>0) for each system are used instead of the equations (6) and (7). In equation (9), β=(β2/β1) is nothing but the equation (7).

$$\beta 1 \times I1\_max(\theta) \times (1 + \alpha(\theta)) = \beta 2 \times I2\_max(\theta) \times (1 - \alpha(\theta)) \quad (8)$$

$$\alpha(\theta) = -(\beta 1 \times I1\_max(\theta) - \beta 2 \times I2\_max(\theta))/ \quad (9)$$
$$(\beta 1 \times I1\_max(\theta) + \beta 2 \times I2\_max(\theta)) -$$
$$(I1 - max(\theta) - (\beta 2/\beta 1) \times I2\_max(\theta))/$$
$$(I1\_max(\theta) + (\beta 1/\beta 2) \times I2\_max(\theta))$$

The following temperature example (unit:[° C.]), which is the same as the first example, is assumed as an upper limit temperature Tmax common to the two systems, a first system current temperature T1, a second system current temperature T2, a first system margin Tm1, and a second system margin Tm2.

Tmax is equal to 150 (Tmax=150).
T1 is equal to 70 (T1=70).
T2 is equal to 110 (T2=110).
Tm1 is equal to 80 (150−70).
Tm2 is equal to 40 (150−110).

The margins Tm1 and Tm2 and the target coefficients β1 and β2 are opposite in magnitude. The target coefficient 31 of the first system having a relatively large margin Tm1 becomes relatively small. The target coefficient β2 of the second system with a relatively small margin Tm2 becomes relatively large. In a pattern A of the second embodiment, the margin of the other system is set as the target coefficient of the own system, as shown in the following equation. In this example, the target ratio (β2/β1) is 2.

β1 is equal to Tm2 and is equal to 40.
β2 is equal to Tm1 and is equal to 80.
β2/β1 is equal to 2.

Figure 15:
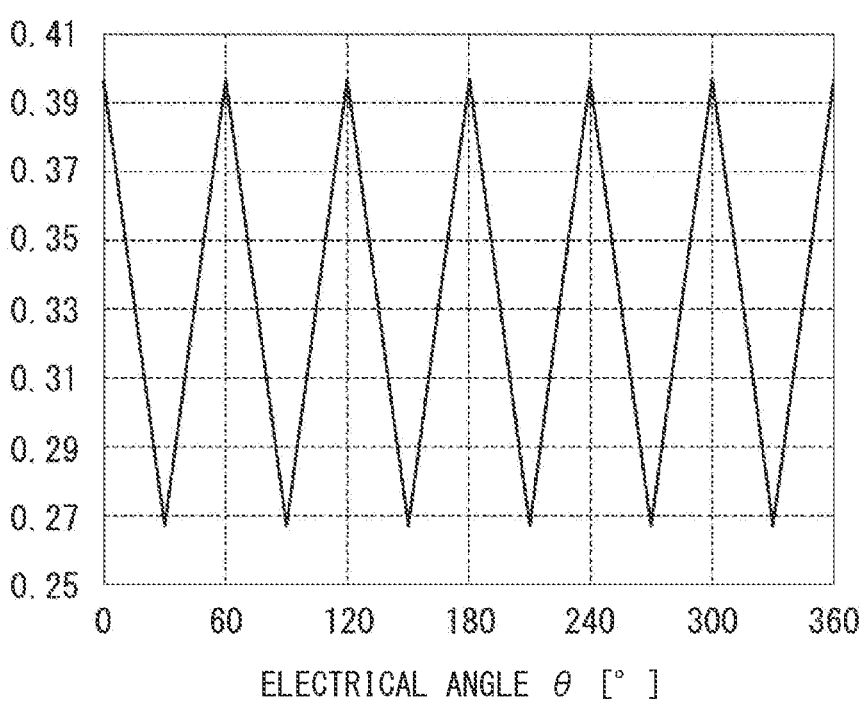
FIG. 15 is an $\alpha$ map when $\beta1=40$ and $\beta2=80$ in a second embodiment.
Figure 16:
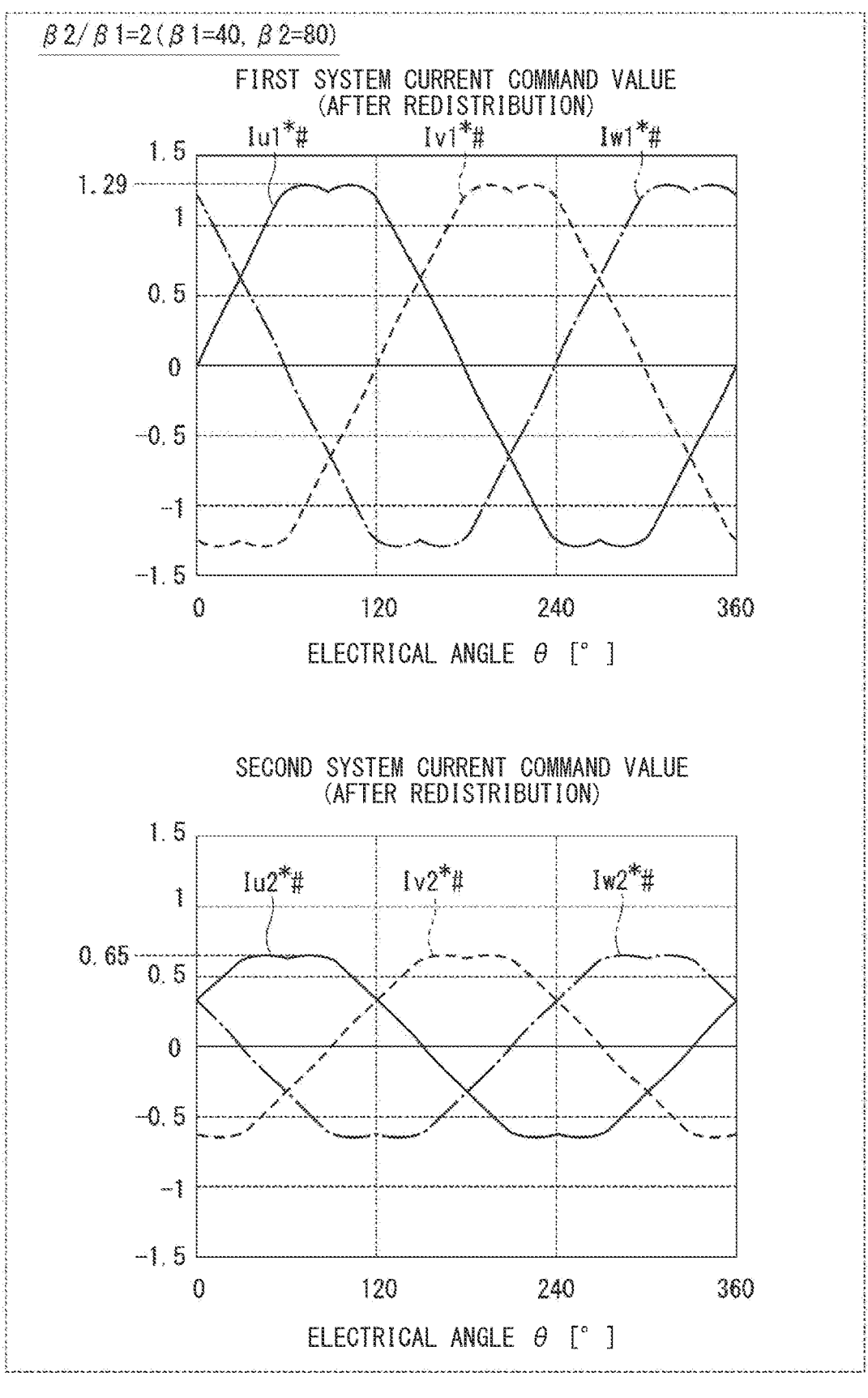
FIG. 16 is a waveform diagram showing the current command value after redistribution in the second embodiment.

FIG. 15 shows an α map in pattern A of the second embodiment. α(θ) increases or decreases within a range of about 0.33±0.06. FIG. 16 shows the current command value after the redistribution in pattern A of the second embodiment. The current peak of the first system, which has a relatively large margin, increases by about 29%, and the current peak of the second system, which has a relatively small margin, decreases by about 35%.

In a pattern B of the second embodiment, a reference temperature Tbase (eg, 20 [° C.]) is introduced. The ratio of the temperature difference from the reference temperature Tbase to the current temperatures T1 and T2 of each system to the temperature difference from the reference temperature Tbase to the upper limit temperature Tmax is calculated as the current temperature indices T1, and T2 by the equations (10.1) and (10.2). The smaller the current temperature indices T1 and T2, the greater the margin. For example, an inverse of the current temperature index T1, T2, or a value obtained by subtracting the current temperature index T1, T2 from a certain value may be defined as the margin.

$$T1 = (T1 - Tbase)/(Tmax - Tbase) \quad (10.1)$$

$$T2 = (T2 - Tbase)/(Tmax - Tbase) \quad (10.2)$$

In the pattern B, the current temperature index of the own system is set as the target coefficient of the own system. The target coefficient β1 of the first system where the current temperature index τ1 is relatively small becomes relatively small. The target coefficient β2 of the second system where the current temperature index τ2 is relatively large becomes relatively large.

β1 is equal to T1 and is equal to (70−20)/(150−20)=5/13≈0.38
β2 is equal to T2 and is equal to (110−20)/(150−20)=9/13≈0.69
β2/β1 is equal to 1.8.

Third Embodiment

Next, with reference to FIGS. 17 to 22, as a third embodiment, an embodiment will be described in which the current redistribution process is applied to a current command value on which fifth and seventh harmonics are superimposed using the technology of Japanese Patent No. 6,455,295 corresponding to U.S. Pat. No. 9,985,569B2.

Figure 17:
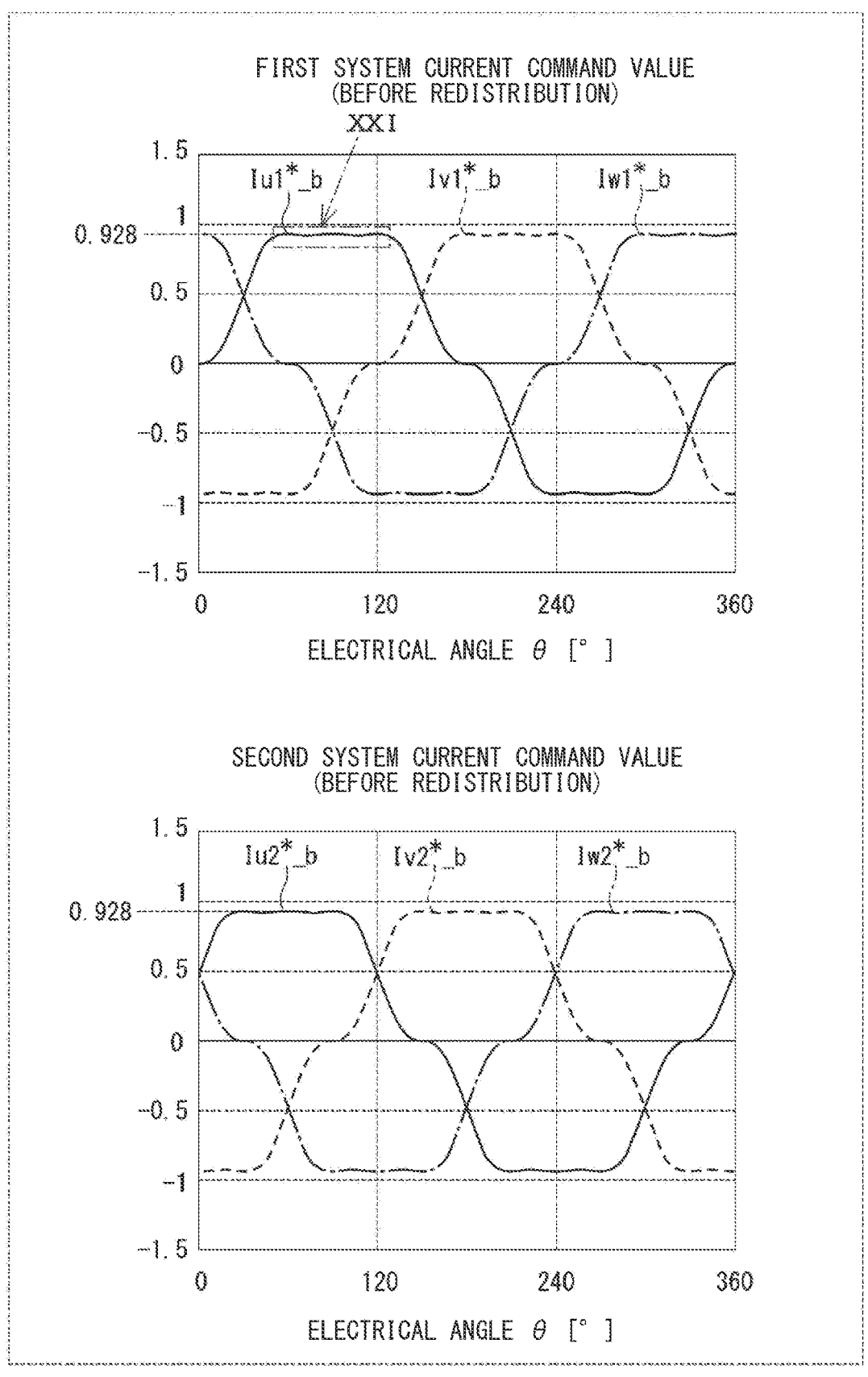
FIG. 17 is a waveform diagram showing the current command value before redistribution in a third embodiment (fifth and seventh harmonic superposition)
Figure 18:
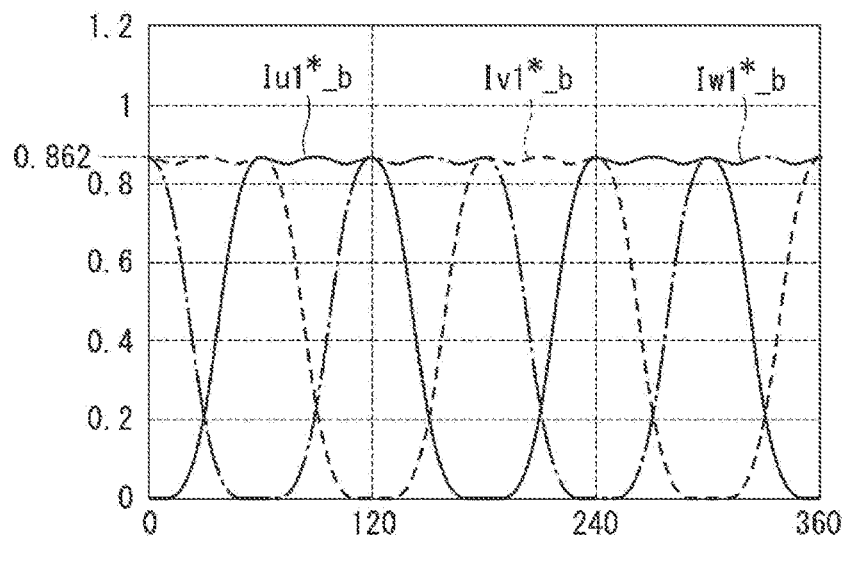
FIG. 18 is a waveform diagram of loss due to the current in FIG. 15.
Figure 18:
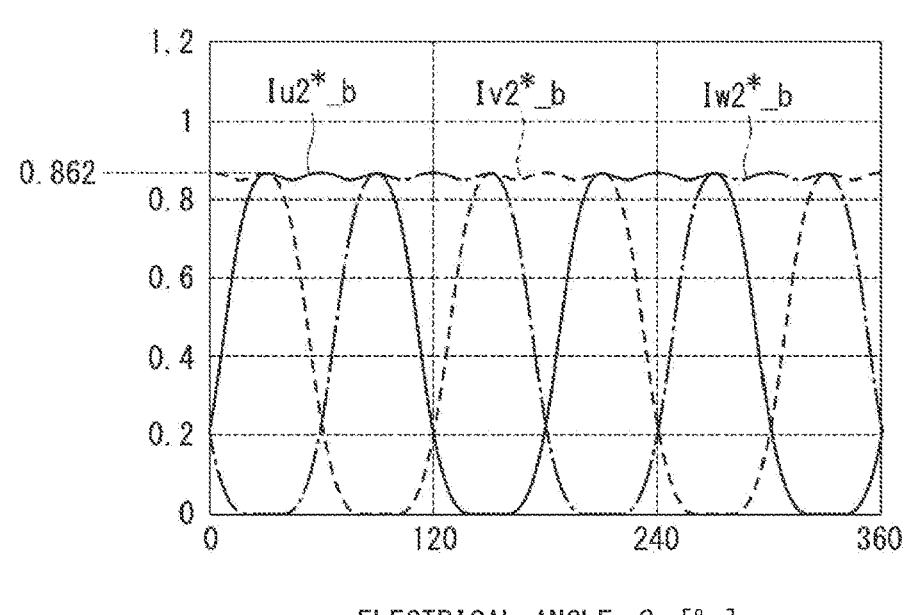

In the third embodiment, the reference amplitude calculation section 34 outputs the specific current command value obtained by superimposing the fifth-order component having an amplitude ratio of 12.5% and the seventh-order component having an amplitude ratio of 5.3% with respect to the first-order component of the phase current in the reference amplitude. FIGS. 17 and 18 show waveforms of current command values and losses before the redistribution of two systems with the phase difference 30° between systems. In FIG. 17, which corresponds to FIG. 13 of Japanese Patent No. 6,455,295, a peak reduction amount of this current is 7.2%, and the loss is reduced by 13.8% with respect to the first-order component of the phase current in the reference amplitude.

Figure 19A:
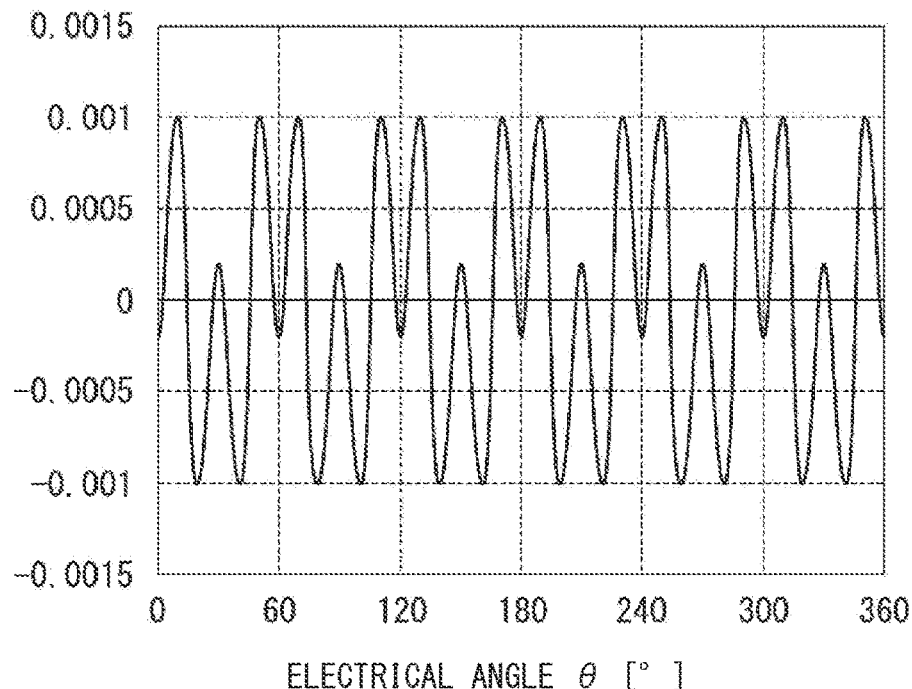
FIG. 19A is an $\alpha$ map when $\beta=1$ in the third embodiment.
Figure 19B:
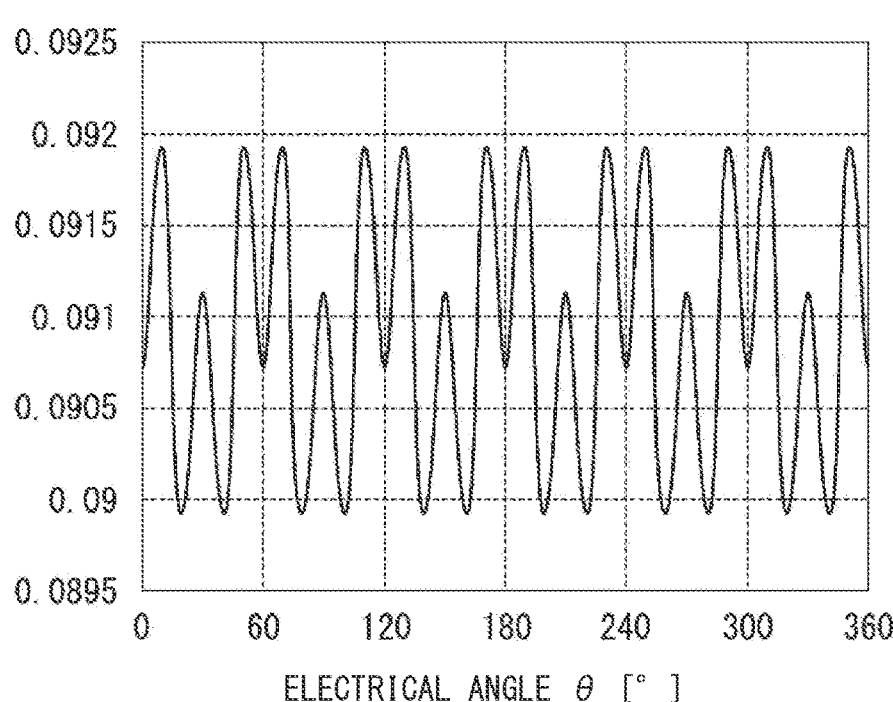
FIG. 19B is an α map when β=1.2 in the third embodiment.

FIGS. 19A and 19B show a maps calculated using equation (7) when $\beta$ is equal to 1 ($\beta$=1) and $\beta$ is equal to 1.2 ($\beta$=1.2). $\alpha(\theta)$ increases or decreases around 0 when $\beta$ is equal to 1 ($\beta$=1) and around 0.091 when $\beta$ is equal to 1.2 ($\beta$=1.2). In the third embodiment, since the current peak is flattened and the system difference in the specific maximum current value is small, the range of increase/decrease in $\alpha(\theta)$ is extremely small at about ±0.001. Furthermore, due to the superposition of harmonic components, the number of increases and decreases in $\alpha$ ($\theta$) in one period of electrical angle increases.

Figure 20:
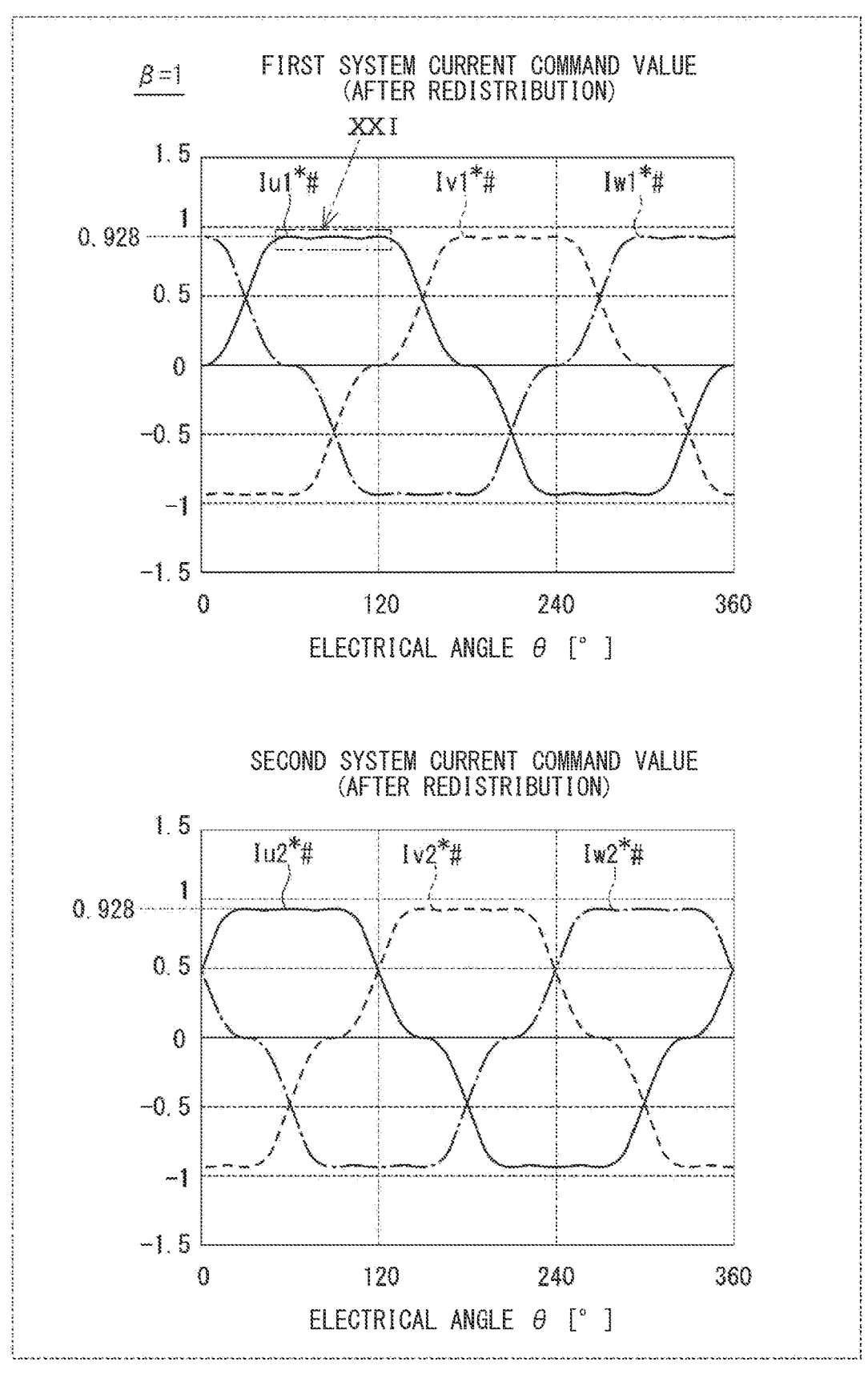
FIG. 20 is a waveform diagram of the current command value (β=1) after redistribution of the third embodiment.
Figure 21:
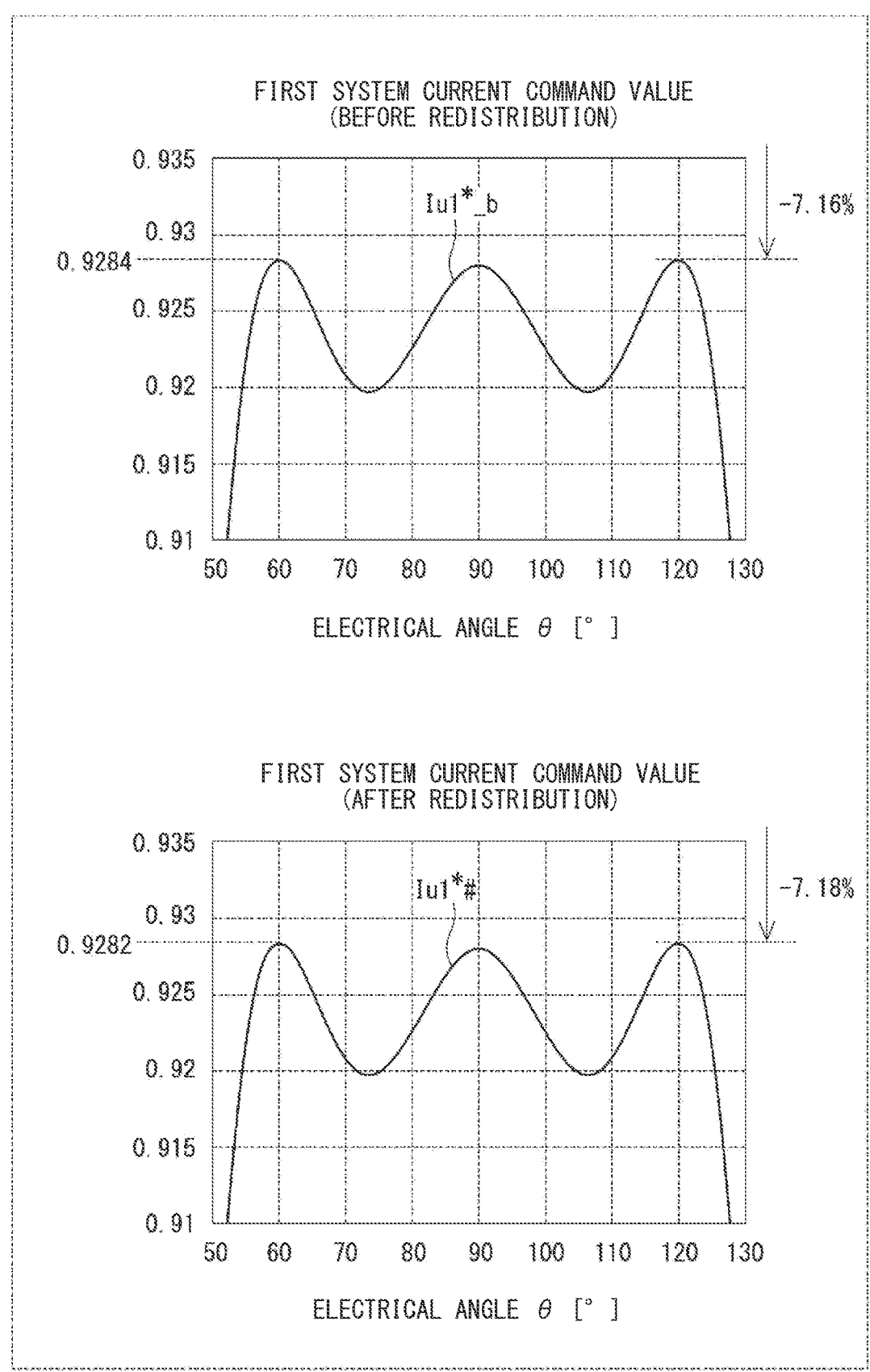
FIG. 21 is an enlarged view of the U1 phase current peak portion in FIGS. 17 and 20.

FIG. 20 shows the current command value after the redistribution when $\beta$ is equal to 1 ($\beta$=1), but the change is so small that it is indistinguishable from FIG. 17. Even in the enlarged view of the current peak portion of the U-phase of the first system shown in FIG. 21, almost no change is seen. However, when the calculated values are compared in detail to the 0.01% digit, the amount of peak reduction before the redistribution is approximately 7.16%, while the amount of peak reduction after the redistribution is approximately 7.18%. In other words, although it is a small value of about 0.02% compared to Japanese Patent No. 6,455,295, the peak reduction effect can be further improved.

Figure 22:
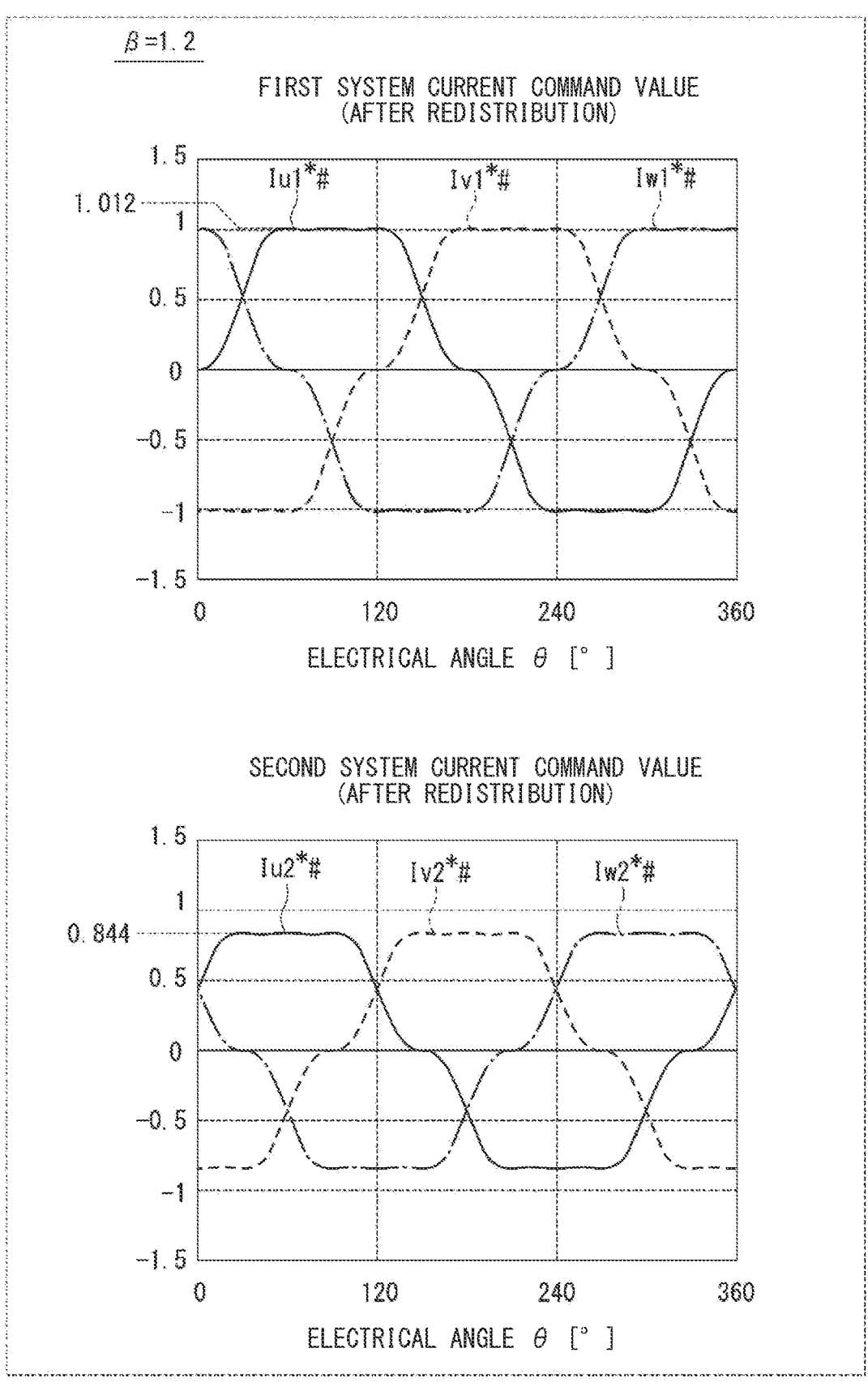
FIG. 22 is a waveform diagram of the current command value (β=1.2) after redistribution in the third embodiment.

FIG. 22 shows the current command value after the redistribution when $\beta$ is equal to 1.2 ($\beta$=1.2). The current peak of the first system increases by about 1.2%, and the current peak of the second system decreases by about 15.6%. In other words, the current command value is redistributed so that the heat generation of the second system, which has a relatively small margin, is further reduced.

Effect of Embodiments

In the current redistribution process of the present embodiment, the current command value is redistributed so that the ratio of the specific maximum current value after the redistribution of each system approaches the target ratio $\beta$. For example, when the margins Tm1 and Tm2 of the two systems are equivalent and the target ratio $\beta$ is 1, the heat generation of the two systems is equally reduced. On the other hand, when there is a difference between the margins Tm1 and Tm2 of the two systems, preferably the current command value is redistributed so as to further reduce heat generation in the system having the smaller margin. Thereby, heat generation in the two systems as a whole can be effectively reduced.

Further, in the present embodiment, since the total output torque of the two systems is generally maintained before and after the redistribution, it is possible to prevent a decrease in torque due to the common output restriction of the two systems.

Other Embodiments (a) The basic value φo of the electrical angle phase difference between the two-system motor is not limited to 30° as exemplified in the above embodiments, but may be other than 30° (for example, 15°, 20°, etc.). The method of comparing specific maximum current values for each electrical angle $\theta$ can be similarly applied regardless of the basic value φo of the phase difference.

(b) The equation for calculating the distribution coefficient $\alpha(\theta)$ is not limited to the equation (7) or (9) based on the idea that the ratio of the specific maximum current values of the two systems after the redistribution matches the target ratio $\beta$. For the equation (7) or (9), the current redistribution process may be performed aiming at a slightly earlier value so that the ratio of the specific maximum current values of the two systems after the redistribution approaches the target ratio $\beta$. Therefore, it is possible to prevent the margins of the two systems from being reversed due to detection errors in the current temperatures T1 and T2.

Further, the distribution coefficient $\alpha(\theta)$ when $\beta$ is not equal to 1 ($\beta$≠1) may be calculated by an equation (11) using offset constant $\gamma$ instead of the equation (7). The offset constant $\gamma$ is determined by, for example, a $\beta$-$\gamma$ map. In this case, the $\alpha$ map when $\beta$ is equal to 1 ($\beta$=1) can be shared.

$$\alpha(\theta) = -(I1\_\max(\theta) - I2\_\max(\theta))/(I1\_\max(\theta) + I2\_\max(\theta)) + \gamma \qquad (9)$$

(c) Instead of using the entire range of values for the $\alpha$ map calculated for each electrical angle $\theta$, upper and lower limit values may be set.

(d) The motor control device of the present disclosure is applicable not only to the electric brake motor but also to three-phase two-system motors of various devices. For example, the steering assist motor of an electric power steering device continues to output torque that balances the external load, and may be driven in a locked (zero rotation) state or in an extremely low speed rotation state. The motor control device of the present disclosure is particularly effective when applied to motors used in such situations.

The present disclosure should not be limited to the embodiment described above. Various other embodiments may be implemented without departing from the scope of the present disclosure.

The control apparatus and the technique according to the present disclosure may be achieved by a dedicated computer provided by constituting a processor and a memory programmed to execute one or more functions embodied by a computer program. Alternatively, the control apparatus and the technique according to the present disclosure may be achieved by a dedicated computer provided by constituting a processor with one or more dedicated hardware logic circuits. Alternatively, the control apparatus and the technique according to the present disclosure may be achieved using one or more dedicated computers constituted by a combination of the processor and the memory programmed to execute one or more functions and the processor with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor control device for controlling energization to a motor having two three-phase winding sets configured such that their electrical angle phase difference is $\pm(\varphi o+120\times n)°$ ($0<\varphi o\leq 60°$, n is an integer), the motor control device comprising:

power converters of two systems, a first system and a second system, which conduct a three-phase current having a phase difference between systems in accordance with a phase difference between the winding sets through the two winding sets; and a current command value calculation unit configured to calculate a current command value for each system based on a command torque;

wherein the current command value calculation unit includes an amplitude sum command value calculation section configured to calculate an amplitude sum command value that is a command value of sum of current amplitudes of the two systems based on the command torque, a reference amplitude calculation section configured to calculate a reference amplitude obtained by dividing the amplitude sum command value into two equal parts and output a current command value based on the reference amplitude, and a current redistribution section configured to execute a current redistribution process that redistributes the current command values of the two systems when a predetermined condition is met, the current redistribution section, in the current redistribution process, calculates a specific maximum current value, which is a maximum value of absolute values of the three-phase current command value in each system, for each electrical angle, and when the electrical angle is defined as $(\theta)$, the specific maximum current value of the first system before the redistribution is defined as $I1\_max(\theta)$, the specific maximum current value of the second system before the redistribution is defined as $I2\_max(\theta)$, and a distribution coefficient for each electrical angle is defined as $\alpha(\theta)$, redistributes the current command values of the two systems so that a ratio between $I1\_max(\theta)\times(1+\alpha(\theta))$, which is the specific maximum current value of the first system after the redistribution, and $I2\_max(\theta)\times(1-\alpha(\theta))$, which is the specific maximum current value of the second system after the redistribution, approaches a predetermined target ratio.

2. The motor control device according to claim 1, wherein the current redistribution section executes the current redistribution process when an ambient temperature of the motor is equal to or higher than a temperature threshold.

3. The motor control device according to claim 1, wherein the current redistribution section executes the current redistribution process when a rotation speed of the motor is less than or equal to a rotation speed threshold.

4. The motor control device according to claim 1, wherein the target ratio is 1.

5. The motor control device according to claim 1, further comprising a temperature detection unit configured to detect or estimate a current temperature of the power converter or the winding set of each system, wherein the current redistribution section calculates for each system a margin that reflects a difference between an upper limit temperature of the power converter or the winding set and the current temperature, and determines the target ratio based on the margin.

6. The motor control device according to claim 1, wherein the motor control device controls energization of the motor that operates a pad of a caliper in an electric brake of a vehicle.

7. A motor control device for controlling energization to a motor having two three-phase winding sets configured such that their electrical angle phase difference is $\pm(\varphi o+120\times n)°$ ($0<\varphi o\leq 60°$, n is an integer), the motor control device comprising:

power converters of two systems, a first system and a second system, which conduct a three-phase current having a phase difference between systems in accordance with a phase difference between the winding sets through the two winding sets; and a computer including a processor and a memory that stores instructions configured to, when executed by the processor, cause the processor to calculate a current command value for each system based on a command torque, calculate an amplitude sum command value that is a command value of sum of current amplitudes of the two systems based on the command torque, calculate a reference amplitude obtained by dividing the amplitude sum command value into two equal parts and output a current command value based on the reference amplitude, and execute a current redistribution process that redistributes the current command values of the two systems when a predetermined condition is met, wherein in the current redistribution process, the computer causes the processor to calculate a specific maximum current value, which is a maximum value of absolute values of the three-phase current command value in each system, for each electrical angle $(\theta)$, and when the electrical angle is defined as $(\theta)$, the specific maximum current value of the first system before the redistribution is defined as $I1\_max(\theta)$, the specific maximum current value of the second system before the redistribution is defined as $I2\_max(\theta)$, and a distribution coefficient for each electrical angle is defined as $\alpha(\theta)$, redistribute the current command values of the two systems so that a ratio between $I1\_max(\theta)\times(1+\alpha(\theta))$, which is the specific maximum current value of the first system after the redistribution, and $I2\_max(\theta)\times(1-\alpha(\theta))$, which is the specific maximum current value of the second system after the redistribution, approaches a predetermined target ratio.

8. The motor control device according to claim 7, wherein the computer causes the processor to execute the current redistribution process when an ambient temperature of the motor is equal to or higher than a temperature threshold.

9. The motor control device according to claim 7, wherein the computer causes the processor to execute the current redistribution process when a rotation speed of the motor is less than or equal to a rotation speed threshold.

\* \* \* \* \*